United States Patent
Koezuka et al.

(10) Patent No.: US 11,263,101 B2
(45) Date of Patent: Mar. 1, 2022

(54) DECISION MODEL GENERATION FOR ALLOCATING MEMORY CONTROL METHODS

(71) Applicant: Kabushiki Kaisha Toshiba, Minato-ku (JP)

(72) Inventors: Mayuko Koezuka, Ota (JP); Yusuke Shirota, Yokohama (JP); Tatsunori Kanai, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 665 days.

(21) Appl. No.: 16/117,339

(22) Filed: Aug. 30, 2018

(65) Prior Publication Data

US 2019/0294989 A1 Sep. 26, 2019

(30) Foreign Application Priority Data

Mar. 20, 2018 (JP) .............................. JP2018-052533

(51) Int. Cl.
*G06F 11/30* (2006.01)
*G06F 11/34* (2006.01)
(Continued)

(52) U.S. Cl.
CPC ...... *G06F 11/3037* (2013.01); *G06F 11/3409* (2013.01); *G06F 11/3419* (2013.01);
(Continued)

(58) Field of Classification Search
CPC ............. G06F 11/3037; G06F 11/3409; G06F 11/3447; G06F 11/3452; G06F 11/3419;
(Continued)

(56) References Cited

U.S. PATENT DOCUMENTS

| | | |
|---|---|---|
| 7,962,657 B1 | 6/2011 | Zimran et al. |
| 8,176,344 B2 | 5/2012 | Koshika et al. |

(Continued)

FOREIGN PATENT DOCUMENTS

| | | |
|---|---|---|
| JP | 2004-70862 A | 3/2004 |
| JP | 2009-211310 | 9/2009 |

(Continued)

OTHER PUBLICATIONS

Zhou, P., et al. "Dynamic Tracking of Page Miss Ratio Curve for Memory Management" ASPLOS'04, pp. 177-188 (2004) (Year: 2004).*

(Continued)

*Primary Examiner* — Jay Hann
(74) *Attorney, Agent, or Firm* — Oblon, McClelland, Maier & Neustadt, L.L.P.

(57) ABSTRACT

A model generation apparatus according to an embodiment includes a processor circuit. The processor circuit is configured to: divide time-series data of operation information in a time direction to generate a plurality of segments; allocate any one memory control method of a plurality of memory control methods to each of the plurality of segments; estimate, for each of the plurality of segments, execution performance of memory access that is obtainable in a case where an information processing apparatus executes processing of a corresponding segment by an allocated memory control method; select a plurality of training segments from among the plurality of segments; and generate a decision model based on the selected plurality of training segments.

13 Claims, 20 Drawing Sheets

(51) Int. Cl.
  *G06F 12/0871* (2016.01)
  *G06N 20/00* (2019.01)
  *G06F 12/02* (2006.01)
(52) U.S. Cl.
  CPC ...... *G06F 11/3452* (2013.01); *G06F 12/0238* (2013.01); *G06F 12/0871* (2013.01); *G06N 20/00* (2019.01); *G06F 2212/1028* (2013.01); *G06F 2212/205* (2013.01); *G06F 2212/222* (2013.01); *Y02D 10/00* (2018.01)
(58) Field of Classification Search
  CPC ............ G06F 12/0871; G06F 12/0866; G06F 12/1027; G06F 2212/1028; G06F 2212/222; G06N 20/00; Y02D 10/00
  See application file for complete search history.

(56) References Cited

U.S. PATENT DOCUMENTS

| | | | |
|---|---|---|---|
| 8,863,139 B2 | 10/2014 | Kakeda et al. | |
| 9,026,719 B2* | 5/2015 | Hyde | G06F 11/34 711/103 |
| 9,927,983 B2* | 3/2018 | Benisty | G06F 3/0653 |
| 9,946,471 B1 | 4/2018 | More et al. | |
| 9,977,487 B2* | 5/2018 | Choi | G11C 16/30 |
| 10,222,984 B1* | 3/2019 | O'Brien, III | G06F 3/0688 |
| 10,241,908 B2* | 3/2019 | Tomlin | G06F 3/0608 |
| 10,417,141 B2* | 9/2019 | Pellegrini | G06F 12/0808 |
| 10,545,793 B2* | 1/2020 | Ananthakrishnan | G06F 9/5027 |
| 10,579,494 B2* | 3/2020 | Schmidt | G06F 11/3006 |
| 10,593,380 B1 | 3/2020 | Volpe | G06F 11/3452 |
| 10,599,349 B2* | 3/2020 | Choi | G06F 3/0688 |
| 10,782,908 B2* | 9/2020 | Mittal | G06F 12/0862 |
| 11,061,814 B1* | 7/2021 | O'Brien, III | G06F 3/0688 |
| 2011/0218770 A1 | 9/2011 | Ii | |
| 2013/0047153 A1 | 2/2013 | Emaru et al. | |
| 2014/0189203 A1* | 7/2014 | Suzuki | G06F 12/0868 711/103 |
| 2015/0372878 A1 | 12/2015 | Ganesan et al. | |
| 2018/0173535 A1 | 6/2018 | Batley et al. | |
| 2019/0294355 A1 | 9/2019 | Shirota et al. | |

FOREIGN PATENT DOCUMENTS

| | | |
|---|---|---|
| JP | 2017-138852 A | 8/2017 |
| JP | 2019-164629 A | 9/2019 |
| JP | 2019-164630 A | 9/2019 |
| JP | 2019-164659 A | 9/2019 |

OTHER PUBLICATIONS

Hu, J., et al. "Optimizing Data Allocation and Memory Configuration for Non-Volatile Memory based Hybrid SPM on Embedded CMPs" IEEE 26th International Parallel and Distributed Processing Symposium Workshops & PhD Forum, pp. 982-989 (2012) (Year: 2012).*
Bertozzi, D., et al. "Performance and Reliability Analysis of Cross-Layer Optimizations of NAND Flash Controllers" ACM Transactions on Embedded Computing Systems, vol. 14, No. 1, Article 7 (2015) (Year: 2015).*
Okamoto, S., et al. "Application Driven SCM & NAND Flash Hybrid SSD Design for Data-Centric Computing System" IEEE Int'l Memory Workshop (2015) available from <https://ieeexplore.ieee.org/abstract/document/7150277> (Year: 2015).*
Sun, C., et al. "Design Guidelines of Storage Class Memory/Flash Hybrid Solid-State Drive Considering System Architecture, Algorithm and Workload Characteristic" IEEE Transactions on Consumer Electronics, vol. 62, issue 3, pp. 267-274 (2016) available from [continued on next line] (Year: 2016).*
Continued from above: available from <https://ieeexplore.ieee.org/abstract/document/7613193>.*
Freitas, R. et al. "Storage-class Memory: The Next Storage System Technology", IBM Journal of Research and Development vol. 52 No. 4, 2008, pp. 9.
Office Action dated Nov. 25, 2019 in U.S. Appl. No. 16/117,315, 30 pages.

* cited by examiner

FIG.4

| TIME | OPERATION INFORMATION #1 (NUMBER OF WRITINGS) | OPERATION INFORMATION #2 (NUMBER OF READOUTS) | OPERATION INFORMATION #3 (PREFETCH SUCCESS RATE) | OPERATION INFORMATION #4 (NUMBER OF CACHE HITS) | OPERATION INFORMATION #5 (NUMBER OF CACHE MISTAKES) | OPERATION INFORMATION #6 (STALL TIME) |
|---|---|---|---|---|---|---|
| $t_0$ | | | | | | |
| $t_1$ | | | | | | |
| $t_2$ | | | | | | |
| $t_3$ | | | | | | |
| $t_4$ | | | | | | |
| $t_5$ | | | | | | |
| ... | | | | | | |

FIG.5

| MEMORY CONTROL METHOD | CONTROL CONTENT |
|---|---|
| FIRST METHOD | 100% OF PAGES ARE SET TO SECOND ACCESS PROCESSING |
| SECOND METHOD | 10% OF PAGES ARE SET TO FIRST ACCESS PROCESSING AND 90% OF PAGES ARE SET TO SECOND ACCESS PROCESSING |
| THIRD METHOD | 20% OF PAGES ARE SET TO FIRST ACCESS PROCESSING AND 80% OF PAGES ARE SET TO SECOND ACCESS PROCESSING |
| FOURTH METHOD | 30% OF PAGES ARE SET TO FIRST ACCESS PROCESSING AND 70% OF PAGES ARE SET TO SECOND ACCESS PROCESSING |

FIG.6

| MEMORY CONTROL METHOD | FIRST CONTROL CONTENT | SECOND CONTROL CONTENT |
|---|---|---|
| FIRST METHOD | 100% OF PAGES ARE SET TO SECOND ACCESS PROCESSING | |
| SECOND METHOD | 10% OF PAGES ARE SET TO FIRST ACCESS PROCESSING AND 90% OF PAGES ARE SET TO SECOND ACCESS PROCESSING | MEMORY USAGE OF FIRST MEMORY UNIT IS SET TO 5% OF NON-VOLATILE MEMORY UNIT |
| THIRD METHOD | 10% OF PAGES ARE SET TO FIRST ACCESS PROCESSING AND 90% OF PAGES ARE SET TO SECOND ACCESS PROCESSING | MEMORY USAGE OF FIRST MEMORY UNIT IS SET TO 10% OF NON-VOLATILE MEMORY UNIT |
| FOURTH METHOD | 20% OF PAGES ARE SET TO FIRST ACCESS PROCESSING AND 80% OF PAGES ARE SET TO SECOND ACCESS PROCESSING | MEMORY USAGE OF FIRST MEMORY UNIT IS SET TO 10% OF NON-VOLATILE MEMORY UNIT |
| FIFTH METHOD | 20% OF PAGES ARE SET TO FIRST ACCESS PROCESSING AND 80% OF PAGES ARE SET TO SECOND ACCESS PROCESSING | MEMORY USAGE OF FIRST MEMORY UNIT IS SET TO 20% OF NON-VOLATILE MEMORY UNIT |
| SIXTH METHOD | 30% OF PAGES ARE SET TO FIRST ACCESS PROCESSING AND 70% OF PAGES ARE SET TO SECOND ACCESS PROCESSING | MEMORY USAGE OF FIRST MEMORY UNIT IS SET TO 15% OF NON-VOLATILE MEMORY UNIT |
| SEVENTH METHOD | 30% OF PAGES ARE SET TO FIRST ACCESS PROCESSING AND 70% OF PAGES ARE SET TO SECOND ACCESS PROCESSING | MEMORY USAGE OF FIRST MEMORY UNIT IS SET TO 30% OF NON-VOLATILE MEMORY UNIT |

DECISION MODEL GENERATION FOR ALLOCATING MEMORY CONTROL METHODS

CROSS-REFERENCE TO RELATED APPLICATIONS

This application is based upon and claims the benefit of priority from Japanese Patent Application No. 2018-052533, filed on Mar. 20, 2018; the entire contents of which are incorporated herein by reference.

FIELD

Embodiments described herein relate generally to a model generation apparatus, an information processing apparatus, a model generation method, and a computer program product.

BACKGROUND

Recently, a high-speed non-volatile memory referred to as a storage class memory has been developed. In addition to being data-rewritable in a page unit, the storage class memory is data-writable in a unit smaller than the page unit, such as a byte unit, for example. A non-volatile memory that has become data-writable in a byte unit in this manner can be used as a main storage device functioning as a work area of a central processing unit (CPU).

In addition, a computer system recently executes large-scale data processing such as online real-time processing, big data processing, deep learning processing, and artificial intelligence (AI) processing. In the case of executing such processing, the computer system needs to use a huge-capacity main storage device.

In addition, in an edge system such as a data center, a robot, a drone, or an edge server, or the like, for implementing high-speed data processing, in-memory data processing of storing data is executed on a main storage device in place of a secondary storage device. In the case of executing such in-memory data processing, a computer system needs to use a huge-capacity main storage device.

In the case of implementing such huge-capacity main storage devices, all by a Dynamic Random Access Memory (DRAM), an amount of standby power becomes problematic. Thus, for realizing a high-speed and power-saving computer system, it is desirable to utilize a high-speed storage class memory with low standby power.

However, while the storage class memory can perform higher integration than the DRAM, the storage class memory generally has access speed slower than that of the DRAM. Thus, a computer system in which all DRAMs are replaced with storage class memories has lower processing speed. In addition, in general, a storage class memory requires low standby power, but requires high dynamic power at the time of access. Thus, in a computer system using a huge-capacity main storage device, it is preferable to combine a high-speed storage device such as a DRAM, and a non-volatile storage device that requires low standby power and can perform high integration, such as a storage class memory, and to access a main storage device using an appropriate memory control method depending on the situations.

Nevertheless, in a computer system, it has been very difficult to select an appropriate memory control method depending on the situations.

BRIEF DESCRIPTION OF THE DRAWINGS

FIG. 4 is a diagram illustrating an example of time-series data of operation information;

FIG. 5 is a diagram illustrating a first example of the details of memory control methods;

FIG. 6 is a diagram illustrating a second example of the details of memory control methods;

DETAILED DESCRIPTION

According to an embodiment, provided is a model generation apparatus for generating a decision model for deciding a memory control method based on the operation information used by an information processing apparatus that accesses a plurality of different types of main storage memories. The model generation apparatus includes a processor circuit. The processor circuit is configured to: acquire time-series data of operation information that is obtainable in a case where the information processing apparatus is operated; divide the time-series data of the operation information in a time direction to generate a plurality of segments; allocate any one memory control method of a plurality of memory control methods to each of the plurality of segments; estimate, for each of the plurality of segments, execution performance of memory access that is obtainable in a case where the information processing apparatus executes processing of a corresponding segment by an allocated memory control method; select a plurality of training segments in which the estimated execution performance satisfies a predefined condition, from among the plurality of segments; and generate the decision model based on the selected plurality of training segments and the allocated memory control methods corresponding to the selected plurality of training segments.

An information processing system according to an embodiment will be described in detail below with reference to the drawings. In addition, while a plurality of embodiments and modified examples will be described below, blocks having substantially same functions and configuration are assigned the same signs, and the description of redundant content will be omitted in the modified examples and second and subsequent embodiments.

First Embodiment

A first embodiment will be described.

Figure 1:
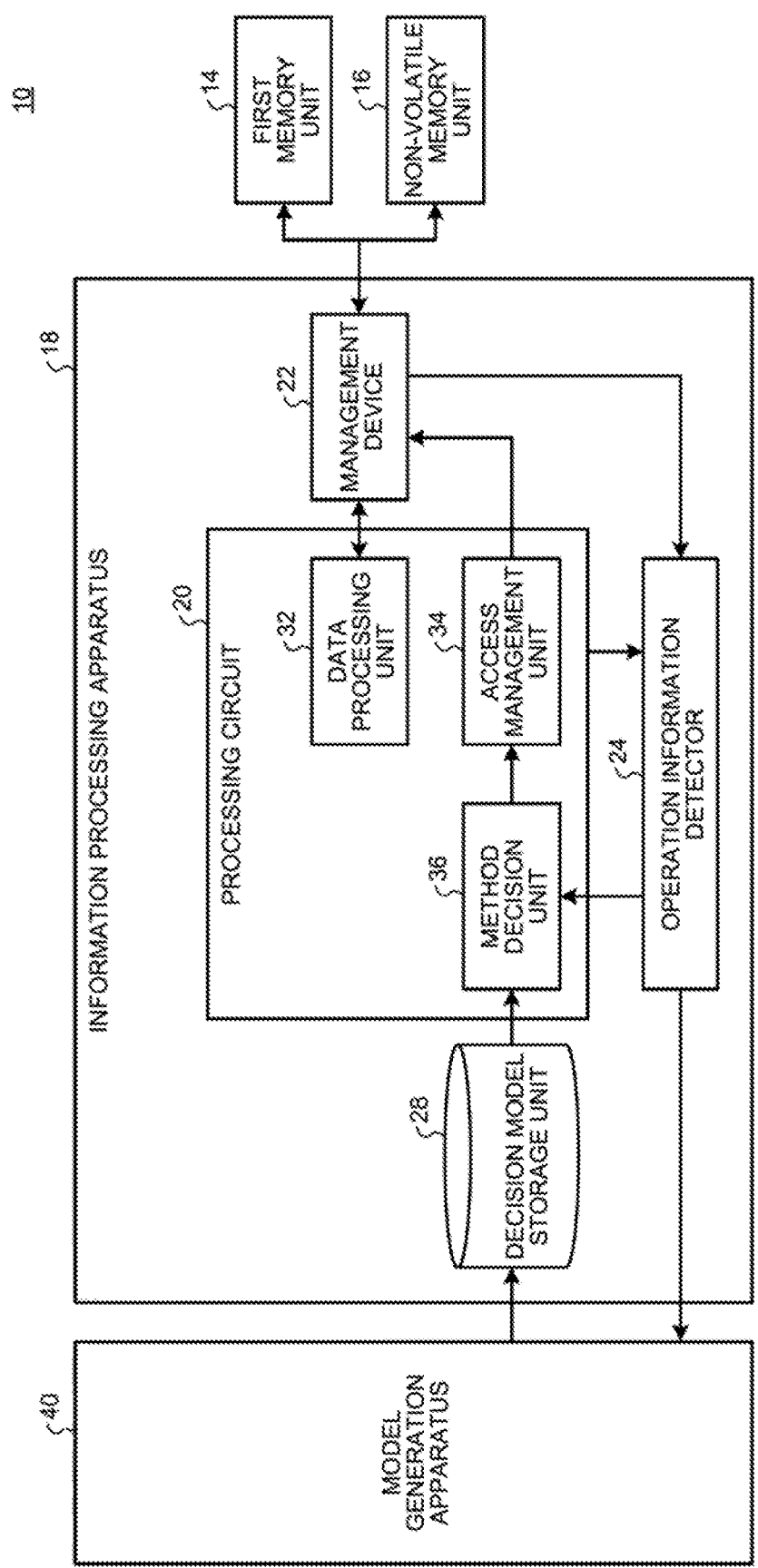
FIG. 1 is a diagram illustrating a configuration of an information processing system according to a first embodiment.

FIG. 1 is a diagram illustrating an example of a configuration of an information processing system 10 according to the first embodiment. The information processing system 10 includes a first memory unit 14, a non-volatile memory unit 16, an information processing apparatus 18, and a model generation apparatus 40.

The first memory unit 14 is a main storage device (main memory) used as a work area by the information processing apparatus 18. The first memory unit 14 is a volatile storage unit in which stored data are erased when power supply is stopped, for example. The first memory unit 14 is a DRAM, for example. In addition, the first memory unit 14 may be a non-volatile memory such as a Magnetoresistive Random Access Memory (MRAM), to which high-speed access can be performed similarly to the DRAM.

In addition, the first memory unit 14 has a larger number of writable times than that of the non-volatile memory unit 16. For example, the first memory unit 14 has such a large number of writable times that design needs not be made considering the number of writable time (e.g. that design can be made assuming that there is no limit on the number of writable times).

The non-volatile memory unit 16 is a memory that continues to store data even if power supply is stopped. The non-volatile memory unit 16 functions as a main storage device of the information processing apparatus 18 together with the first memory unit 14.

The non-volatile memory unit 16 includes a large-capacity high-speed non-volatile memory (Non-volatile Memory) having a larger capacity than the DRAM, for example. The non-volatile memory unit 16 is a MRAM, a phase change memory (PCM), a phase random access memory (PRAM), a phase change random access memory (PCRAM), a resistance change random access memory (ReRAM), a ferroelectric random access memory (FeRAM), a 3DXPoint, a Memristor, or the like, for example. The non-volatile memory unit 16 may be a memory referred to as a so-called storage class memory (SCM). In addition, the non-volatile memory unit 16 may be a module in which a plurality of semiconductor devices are provided on one substrate, casing, or the like.

The non-volatile memory unit 16 has a larger capacity as compared with the first memory unit 14. The capacity of the non-volatile memory unit 16 may be the same as that of the first memory unit 14. In addition, the non-volatile memory unit 16 has an access speed equivalent to or a bit slower than an access speed of the first memory unit 14. In addition, the non-volatile memory unit 16 has zero standby power or extremely-little standby power as compared with the first memory unit 14. As an example, the non-volatile memory unit 16 is a memory having an access latency of about 10 nanoseconds to several microseconds.

The non-volatile memory unit 16 is data-writable and data-readable in a unit of a small region such as a byte unit. Thus, the information processing apparatus 18 can directly access the non-volatile memory unit 16 by a load command or a store command. The information processing apparatus 18 directly accesses the non-volatile memory unit 16 in a cache line unit or the like, for example.

The non-volatile memory unit 16 includes a plurality of pages. The page corresponds to a data unit managed by the information processing apparatus 18. For example, the page corresponds to a page of a virtual storage device managed by an operating system. The page may be 4K bytes, for example. The information processing apparatus 18 can perform data writing and data reading also in a page unit.

The information processing apparatus 18 accesses a plurality of types of different main storage memories. In the present embodiment, the information processing apparatus 18 accesses the first memory unit 14 and the non-volatile memory unit 16. The information processing apparatus 18 may further access another main memory of a type different from the first memory unit 14 and the non-volatile memory unit 16.

The information processing apparatus 18 includes a processing circuit 20, a management device 22, an operation information detector 24, and a decision model storage unit 28.

The processing circuit 20 includes one or a plurality of processors. The processor is a central processing unit (CPU), for example. The processor may include one or a plurality of CPU cores. The processing circuit 20 processes data by executing a program. In accordance with the execution of the program, the processing circuit 20 reads out data from the first memory unit 14 or the non-volatile memory unit 16, or writes data into the first memory unit 14 or the non-volatile memory unit 16.

In addition, the processing circuit 20 includes a hierarchical cache memory such as an L1 data cache, an L1 command cache, an L2 cache, and an L3 cache. Using such a cache memory, the processing circuit 20 temporarily stores data stored in the first memory unit 14 or the non-volatile memory unit 16. In the case of making a cache mistake in the lowest cache (last-level cache) in the hierarchical caches, for example, the processing circuit 20 accesses the first memory unit 14 or the non-volatile memory unit 16 to read out or write in necessary data in a cache line unit.

In addition, the processing circuit 20 may be any circuit as long as data processing can be executed. For example, the processing circuit 20 may be a graphics processing unit (GPU) used by a general-purpose computing on graphics processing unit (GPGPU). In addition, the processing circuit 20 may be an accelerator such as a field programmable gate array (FPGA).

The management device 22 controls data readout and data writing that are performed by the processing circuit 20 with respect to the first memory unit 14 and the non-volatile memory unit 16. The management device 22 processes an access request to the first memory unit 14 and the non-volatile memory unit 16 from the processing circuit 20. More specifically, in response to a writing command from the processing circuit 20, the management device 22 writes data into the first memory unit 14 or the non-volatile memory unit 16. In addition, in response to a readout command from the processing circuit 20, the management device 22 reads out data from the first memory unit 14 or the non-volatile memory unit 16, and grants the read-out data to the processing circuit 20.

In addition, the management device 22 executes wear leveling control on the non-volatile memory unit 16. More specifically, the management device 22 manages the number of data rewriting for each area in the non-volatile memory unit 16. Then, based on the number of rewritings of each area, the management device 22 controls a data writing position so that data is averagely written in throughout the entire area in the non-volatile memory unit 16.

In addition, the management device 22 is a circuit formed on the same semiconductor substrate as the processing circuit 20. In addition, the management device 22 may be a memory controller formed by hardware separate from the processing circuit 20. In addition, the management device 22 may be implemented by a combination of a part of pieces of hardware of the processing circuit 20, and a memory controller. In addition, the management device 22 may be implemented by a part of functions of an operating system executed by the processing circuit 20. In addition, the management device 22 may be implemented by a part of functions of an operating system executed by the processing circuit 20, or may be implemented by a combination of a part of functions of the operating system, and a memory controller.

In addition, for example, the management device 22 may be a memory management unit (MMU) formed by hardware separate from the processing circuit 20. In addition, the management device 22 may be implemented by a combination of a part of pieces of hardware of the processing circuit 20, and a memory management unit. In addition, the management device 22 may be implemented by a combination of a part of functions of an operating system executed by the processing circuit 20, and a memory management unit.

In addition, the management device 22 may be implemented by a combination of a memory controller and an MMU. In addition, the management device 22 may be implemented by a combination of a part of pieces of hardware of the processing circuit 20, a memory controller, and a memory management unit. In addition, the management device 22 may be implemented by a combination of a part of functions of an operating system executed by the processing circuit 20, a memory controller, and a memory management unit.

The operation information detector 24 detects operation information in at least either one of the processing circuit 20 and the management device 22. The operation information detector 24 may be implemented as a hardware circuit in the processing circuit 20. In addition, the operation information detector 24 may be implemented as a partial hardware circuit or a partial function in the management device 22. In addition, the operation information detector 24 may be implemented as a part of functions of an operating system executed by the processing circuit 20. The operation information detector 24 may be a circuit referred to as a so-called performance counter. In addition, the operation information will be further described with reference to FIG. 4.

The decision model storage unit 28 stores a decision model for deciding a memory control method, from operation information. The decision model is generated by the model generation apparatus 40, and written into the decision model storage unit 28. The decision model and the model generation apparatus 40 will be further described in FIG. 10 and subsequent drawings.

The processing circuit 20 includes a data processing unit 32, an access management unit 34, and a method decision unit 36. The data processing unit 32 is implemented by the processing circuit 20 executing an application program, for example. In addition, the method decision unit 36 and the access management unit 34 are implemented by the processing circuit 20 executing a part of functions of the operating system, for example.

The data processing unit 32 executes information processing according to an application program. Furthermore, the data processing unit 32 grants, to the management device 22, an access request with respect to the first memory unit 14 and the non-volatile memory unit 16. In other words, the data processing unit 32 grants, to the management device 22, a writing command for writing data into the first memory unit 14 or the non-volatile memory unit 16. In addition, the data processing unit 32 grants, to the management device 22, a readout command for reading out data from the first memory unit 14 or the non-volatile memory unit 16.

The access management unit 34 manages a memory control method for the management device 22 accessing the first memory unit 14 and the non-volatile memory unit 16. The management device 22 can access the first memory unit 14 and the non-volatile memory unit 16 by a plurality of memory control methods. The access management unit 34 manages by which memory control method of the plurality of memory control methods the management device 22 performs access.

In addition, the access management unit 34 stores a conversion table. The conversion table stores, for each page for which an access request is issued, a correspondence relationship between a request address and a corresponding page number (physical address) in the first memory unit 14 or the non-volatile memory unit 16. Furthermore, the conversion table stores, for each page for which the processing circuit 20 issues an access request, an access method indicating which of first access processing and second access processing is to be executed.

The first access processing is a method of writing and reading data transferred from the non-volatile memory unit 16 to the first memory unit 14. The second access processing is a method of directly writing and reading data stored in the non-volatile memory unit 16.

Then, for a page for which the data processing unit 32 has issued an access request, the management device 22 accesses the first memory unit 14 and the non-volatile memory unit 16 by an access method stored in the conversion table. In other words, in a case where a writing or readout request is received for a page set to the first access processing, the management device 22 executes the first access processing. In addition, in a case where a writing or readout request is received for a page set to the second access processing, the management device 22 executes the second access processing. In addition, the details of the conversion table will be further described with reference to FIG. 2. In addition, the access methods will be further described with reference to FIG. 3.

The method decision unit 36 decides any one memory control method of a plurality of memory control methods based on operation information detected by the operation information detector 24, and a decision model stored in the decision model storage unit 28. Then, the method decision unit 36 performs setting processing for the access management unit 34 and the like so that the management device 22 accesses the first memory unit 14 and the non-volatile memory unit 16 by the decided memory control method. The memory control methods will be further described with reference to FIGS. 5 and 6.

Figure 2:
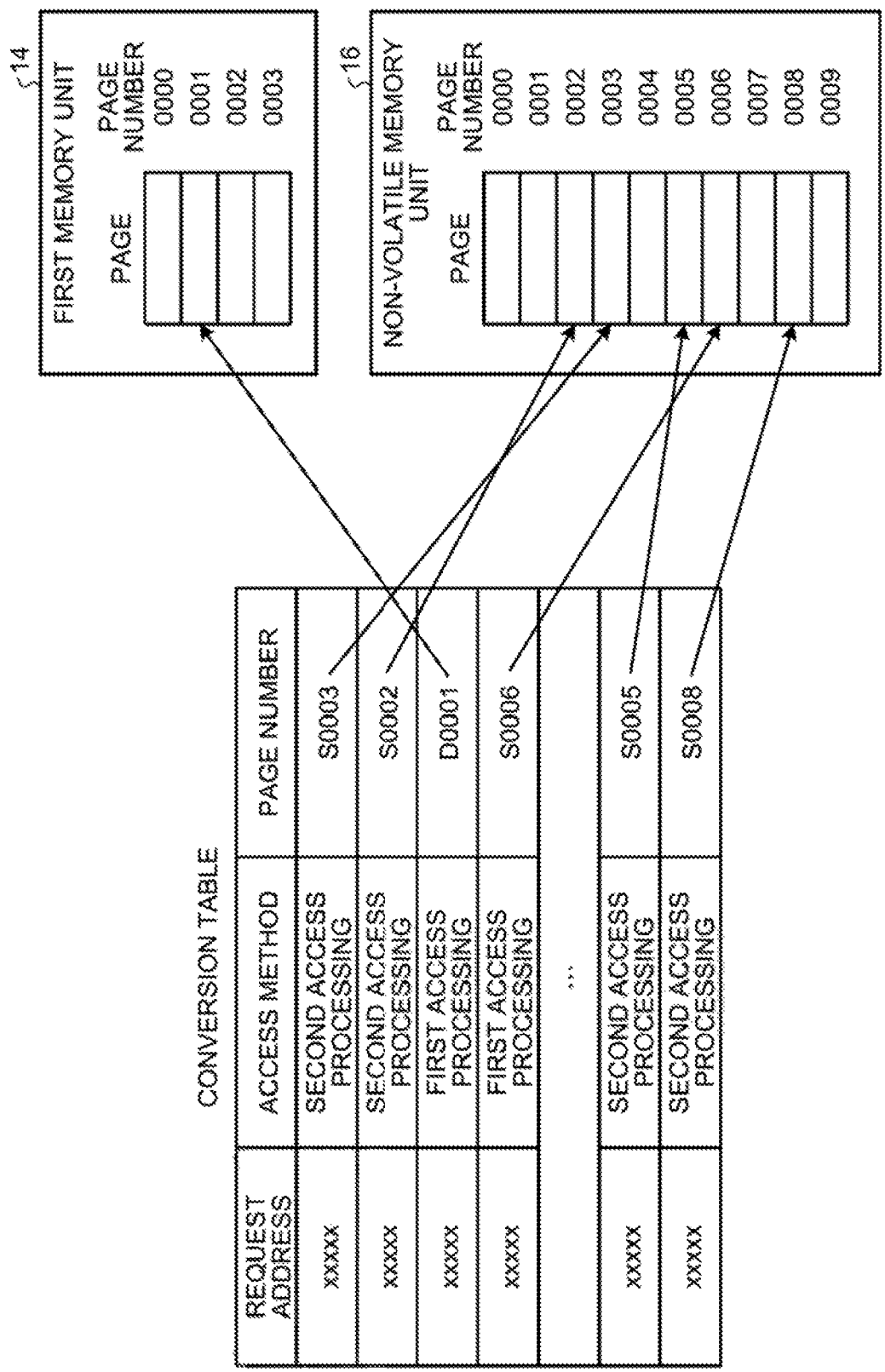
FIG. 2 is a diagram illustrating an example of a conversion table.

FIG. 2 is a diagram illustrating an example of the conversion table. The conversion table stores, for each page for which the processing circuit 20 issues an access request, a correspondence relationship between a request address and a corresponding page number (physical address) in the first memory unit 14 or the non-volatile memory unit 16. In other words, the conversion table stores mapping information indicating in which page in the first memory unit 14 or the non-volatile memory unit 16 data corresponding to the request address issued by the processing circuit 20 is stored.

For example, in the example in FIG. 2, a page for which "Sxxxx" is described in the column of a page number in the conversion table indicates a page having a page number "xxxx" in the non-volatile memory unit 16. For example, in the example in FIG. 2, a page for which "Dxxxx" is described in the column of a page number indicates a page having a page number "xxxx" in the first memory unit 14. In addition, x here indicates an arbitrary value.

Furthermore, the conversion table stores, for each page for which the processing circuit 20 issues an access request, an access method indicating which of first access processing and second access processing is to be executed. In addition, the configuration of the conversion table is not limited to the configuration as illustrated in FIG. 2, and the conversion table may have another configuration.

Figure 3:
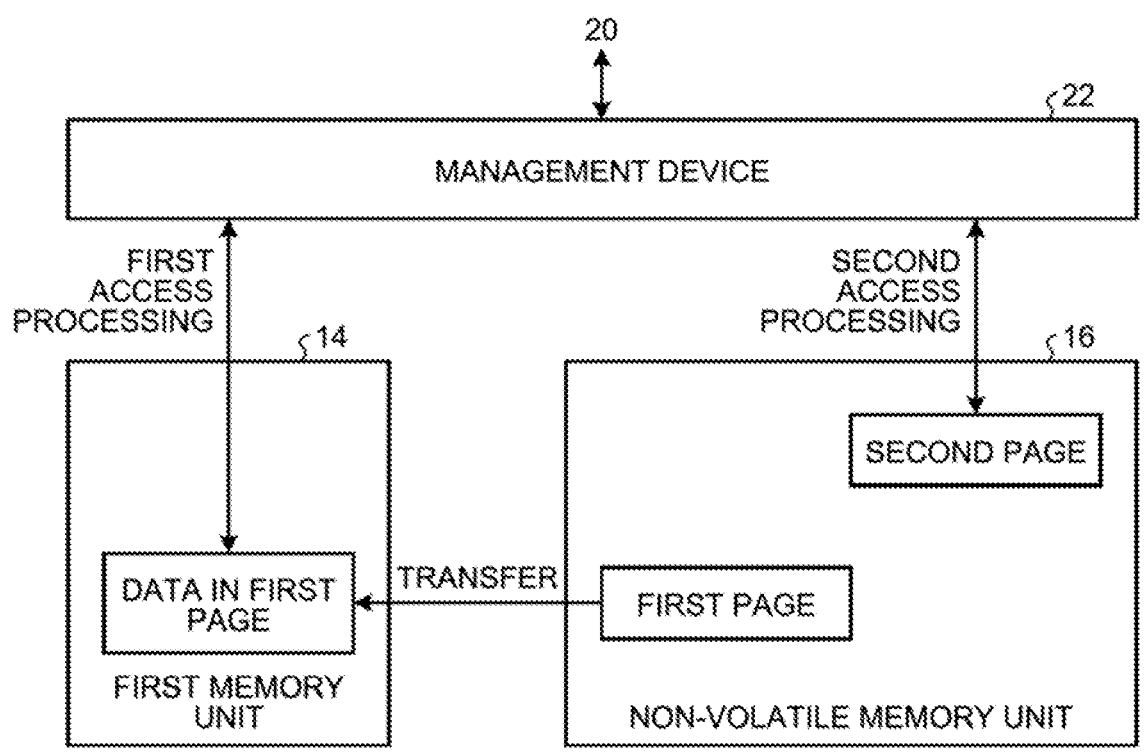
FIG. 3 is a diagram illustrating the details of first access processing and second access processing.

FIG. 3 is a diagram illustrating the details of the first access processing and the second access processing. In a case where a writing or readout request is received for a first page set to the first access processing, the management device 22 executes the first access processing on the non-volatile memory unit 16.

For example, as illustrated in FIG. 3, in the first access processing, the management device 22 transfers all data stored in the first page in the non-volatile memory unit 16, and stores the data into the first memory unit 14. The first memory unit 14 can thereby store a copy of the data stored in the first page in the non-volatile memory unit 16. Subsequently, in the first access processing, the management device 22 performs readout and writing with respect to the data transferred from the non-volatile memory unit 16 that is stored in the first memory unit 14. For example, the management device 22 performs data readout and data writing with respect to the data transferred from the non-volatile memory unit 16 to the first memory unit 14, in a size smaller than a page (e.g. cache line size of a processor). Then, in the first access processing, in cases such as a case where a free space of the first memory unit 14 becomes insufficient, and it becomes impossible to transfer data from the non-volatile memory unit 16 to the first memory unit 14, and a case where it is determined that storage in the first memory unit 14 is unnecessary, the management device 22 writes back the data transferred to the first memory unit 14, to the first page in the non-volatile memory unit 16.

In addition, the management device 22 may write back the data transferred to the first memory unit 14, to pages other than the first page (the same location). For example, in the first access processing, the management device 22 may write back the data transferred from the non-volatile memory unit 16 to the first memory unit 14, to an unused page not associated with any request address. The management device 22 can thereby reduce a gap between the numbers of rewritings among pages, and suppress quality deterioration of a specific page.

In addition, in a case where a writing or readout request is received for a second page set to the second access processing, the management device 22 executes the second access processing on the non-volatile memory unit 16.

For example, as illustrated in FIG. 3, in the second access processing, the management device 22 directly performs readout and writing with respect to the second page in the non-volatile memory unit 16. For example, the management device 22 performs readout and writing of data in a size smaller than a page.

In this manner, the management device 22 accesses the non-volatile memory unit 16 by two types of access methods. For example, in a case where an application having high locality is executed for memory access, the management device 22 accesses a page stored in the non-volatile memory unit 16, by the first access processing. The management device 22 can thereby perform processing on the same page at higher speed in a case where an application having high locality is executed for memory access.

In addition, for example, in a case where processing with low locality is executed for memory access as in random access, the management device 22 accesses a page stored in the non-volatile memory unit 16, by the second access processing. The management device 22 can thereby eliminate an overhead of transfer processing from the non-volatile memory unit 16 to the first memory unit 14, and can efficiently perform processing, in a case where processing with low locality is executed. In this manner, the management device 22 can efficiently perform processing by using two types of access methods including the first access processing and the second access processing.

FIG. 4 is a diagram illustrating an example of time-series data of operation information. At regular time intervals, the operation information detector 24 detects operation information in at least either one of the processing circuit 20 and the management device 22.

For example, the operation information is the number of writings performed by the processing circuit 20 with respect to the main storage device, the number of readouts performed by the processing circuit 20 with respect to the main storage device, a prefetch success rate of the processing circuit 20, the number of cache hits of the processing circuit 20, the number of cache mistakes of the processing circuit 20, and the like. In addition, the operation information is not limited to these, and for example, the operation information may be the number of predetermined events in the processing circuit 20 or the management device 22, the number of retired commands, the number of cache hits/the number of cache mistakes of each hierarchy (L1 cache, L2 cache, L3 cache, and last-level cache) in the number of core clocks and cache memory, a stall time, and the like.

The operation information detector 24 outputs such operation information in association with a detection time. The method decision unit 36 acquires the operation information detected by the operation information detector 24, as time-series data associated with time.

FIG. 5 is a diagram illustrating a first example of the details of memory control methods. The management device 22 accesses the first memory unit 14 and the non-volatile memory unit 16 by any one memory control method of a plurality of memory control methods.

For example, the plurality of memory control methods may be distinguished from each other by a ratio between the number of pages set to the first access processing, and the number of pages set to the second access processing, among a plurality of pages. For example, in the example in FIG. 5, the management device 22 accesses the first memory unit 14 and the non-volatile memory unit 16 by any of first to fourth methods having different ratios.

For example, the first method in FIG. 5 is a method in which 100% of pages are set to the second access processing. In addition, the second method in FIG. 5 is a method in which 10% of pages are set to the first access processing, and 90% of the pages are set to the second access processing. In addition, the third method in FIG. 5 is a method in which 20% of pages are set to the first access processing, and 80% of the pages are set to the second access processing. In addition, the fourth method in FIG. 5 is a method in which 30% of pages are set to the first access processing, and 70% of the pages are set to the second access processing. In addition, a plurality of memory control methods may be distinguished from each other by ratios finer than FIG. 5.

FIG. 6 is a diagram illustrating a second example of the details of memory control methods. In addition, a plurality of memory control methods may be further distinguished from each other by an upper limit value of a memory usage of the first memory unit 14. For example, in the example in FIG. 6, the management device 22 accesses the first memory unit 14 and the non-volatile memory unit 16 by any of eight methods having different ratios and memory usages.

For example, a first method in FIG. 6 is a method in which 100% of pages are set to the second access processing, and there is no limit on the memory usage of the first memory unit 14. A second method in FIG. 6 is a method in which 10% of pages are set to the first access processing, and an upper limit value of a memory usage of the first memory unit 14 is set to 5% of the non-volatile memory unit 16. A third method in FIG. 6 is a method in which 10% of pages are set to the first access processing, and an upper limit value of the memory usage is set to 10%.

A fourth method in FIG. 6 is a method in which 20% of pages are set to the first access processing, and an upper limit value of the memory usage is set to 10%. A fifth method in FIG. 6 is a method in which 20% of pages are set to the first access processing, and an upper limit value of the memory usage is set to 20%.

A sixth method in FIG. 6 is a method in which 30% of pages are set to the first access processing, and an upper limit value of the memory usage is set to 15%. A seventh method in FIG. 6 is a method in which 30% of pages are set to the first access processing, and an upper limit value of the memory usage is set to 30%. In addition, a plurality of memory control methods may be distinguished from each other by finer ratios and upper limit values.

Memory control methods to be set by the processing circuit 20 are not limited to the memory control methods as illustrated in FIGS. 5 and 6, and the processing circuit 20 may set other methods. In addition, for example, the information processing system 10 may include, as a main storage device, a second storage unit having a property different from the first memory unit 14 and the non-volatile memory unit 16. In such a case, the management device 22 may further execute, as an access method, third access processing of performing access after copying data from the non-volatile memory unit 16 to the second storage unit, for example. Then, the management device 22 may include, in a plurality of memory control methods, a method of setting ratios between the numbers of pages that are to be set to the first access processing, the second access processing, and the third access processing, and the like.

Figure 7:
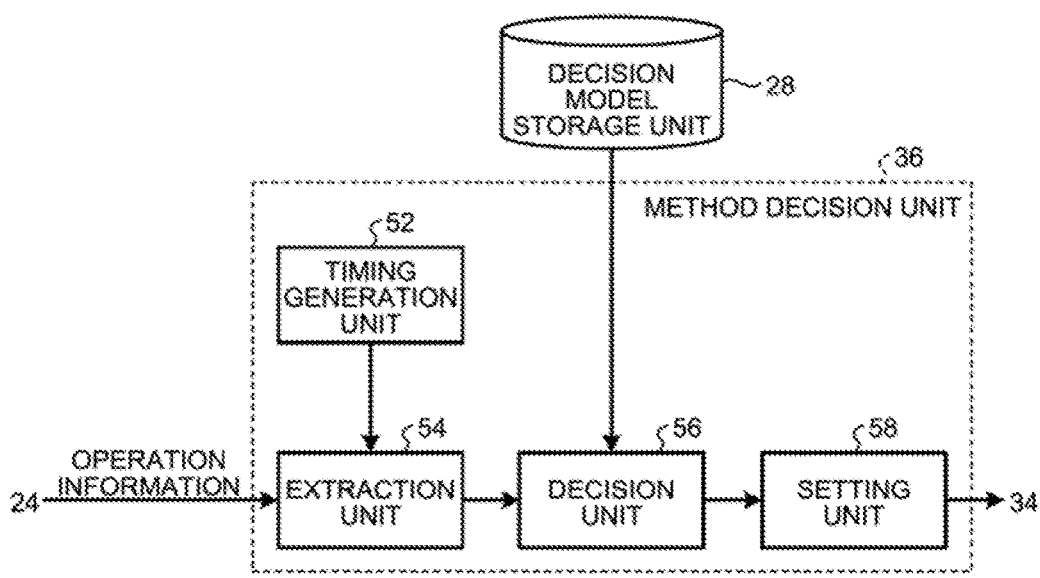
FIG. 7 is a diagram illustrating a configuration of a method decision unit according to the first embodiment.

FIG. 7 is a diagram illustrating a configuration of the method decision unit 36 according to the first embodiment, together with the decision model storage unit 28. The method decision unit 36 includes a timing generation unit 52, an extraction unit 54, a decision unit 56, and a setting unit 58.

The timing generation unit 52 grants an instruction for starting a detection period, to the extraction unit 54 and the setting unit 58, at a timing at which the information processing apparatus 18 starts an operation, and at regular time intervals after the operation start. In addition, the timing generation unit 52 may grant an instruction for starting a detection period, to the extraction unit 54 and the setting unit 58, at irregular time intervals.

The extraction unit 54 receives the start instruction from the timing generation unit 52. The extraction unit 54 acquires, from the operation information detector 24, operation information in at least either one of the processing circuit 20 and the management device 22, in a certain period (detection period) since the start instruction has been received.

The decision unit 56 decides a memory control method based on the operation information acquired by the extraction unit 54, and a decision model stored in the decision model storage unit 28. For example, the decision unit 56 decides one appropriate memory control method from among a plurality of memory control methods as illustrated in FIG. 5 or 6.

The decision model is an arithmetic expression for deciding any one optimum memory control method of a plurality of memory control methods, from operation information, for example. The decision model may be a decision tree, linear regression, a neural network, a support vector machine, and the like, for example. In addition, the decision model will be further described in FIG. 10 and subsequent drawings.

The setting unit 58 receives the start instruction from the timing generation unit 52. The setting unit 58 performs setting processing for the access management unit 34 so that the management device 22 accesses the first memory unit 14 and the non-volatile memory unit 16 by a standard memory control method, in a certain period (detection period) since the start instruction has been received. The management device 22 can thereby access the first memory unit 14 and the non-volatile memory unit 16 by the standard memory control method in the detection period.

For example, the setting unit 58 sets access methods for all the pages to be accessed, to the second access processing in the detection period. The management device 22 can thereby access the first memory unit 14 and the non-volatile memory unit 16 by the second access processing in the detection period. In addition, in the detection period, the setting unit 58 may set any memory control method if a memory control method can be decided by the decision model. In a case where operation information acquired by the extraction unit 54 is not to be affected by a difference in a memory control method, the setting unit 58 may set any memory control method in the detection period.

In a period coming after the lapse of the detection period, the setting unit 58 performs setting processing for the access management unit 34 so that the management device 22 accesses the first memory unit 14 and the non-volatile memory unit 16 by a selected optimum memory control method. The management device 22 can thereby access the first memory unit 14 and the non-volatile memory unit 16 by the selected memory control method, after the lapse of the detection period.

For example, the setting unit 58 sets respective access methods for a plurality of pages in a conversion table to the first access processing or the second access processing according to the selected memory control method. For example, in a case where a plurality of memory control methods are distinguished from each other by a ratio between the number of pages set to the first access processing, and the number of pages set to the second access processing, the setting unit 58 sets respective access methods for a plurality of pages in a conversion table to the first access processing or the second access processing according to a ratio indicated by the selected memory control method.

In addition, the setting unit 53 may only change access methods for pages recently (e.g. prior to a predetermined period) accessed, and pages to be newly accessed after the detection period, without changing access methods for all pages managed by the conversion table. In addition, the setting unit 58 may change access methods for pages to be newly accessed after the detection period.

In addition, the setting unit 58 may change access methods for pages managed by a virtual management mechanism referred to as a Translation Lookaside Buffer (TLB) that is managed by the processing circuit 20. The TLB stores correspondence relationship information indicating correspondence between a request address (logical address) and a physical address in a page, for converting an address from a virtual address to a physical address. Nevertheless, the correspondence relationship information is replaced as necessary because entries held by the TLB are limited. The TLB preferentially stores correspondence relationship information regarding pages recently accessed at high frequency, for example.

Furthermore, in a case where a plurality of memory control methods are distinguished from each other by an upper limit value of a memory usage of the first memory unit 14, the setting unit 58 sets an upper limit value indicated in the selected memory control method, as a memory usage of the first memory unit 14. In a case where an upper limit value of a memory usage of the first memory unit 14 is set, the management device 22 performs access control for the first memory unit 14 and the non-volatile memory unit 16 so that an amount of data copied in the first memory unit 14 does not exceeds the upper limit value. Specifically, in a case where the memory usage of the first memory unit 14 would exceed the upper limit value if data in the first page are transferred from the non-volatile memory unit 16 to the first memory unit 14 for accessing the first page set to the first access processing, the management device 22 writes back data in any page that are stored in the first memory unit 14, to the non-volatile memory unit 16, and then, transfers the data in the first page from the non-volatile memory unit 16 to the first memory unit 14.

Figure 8:
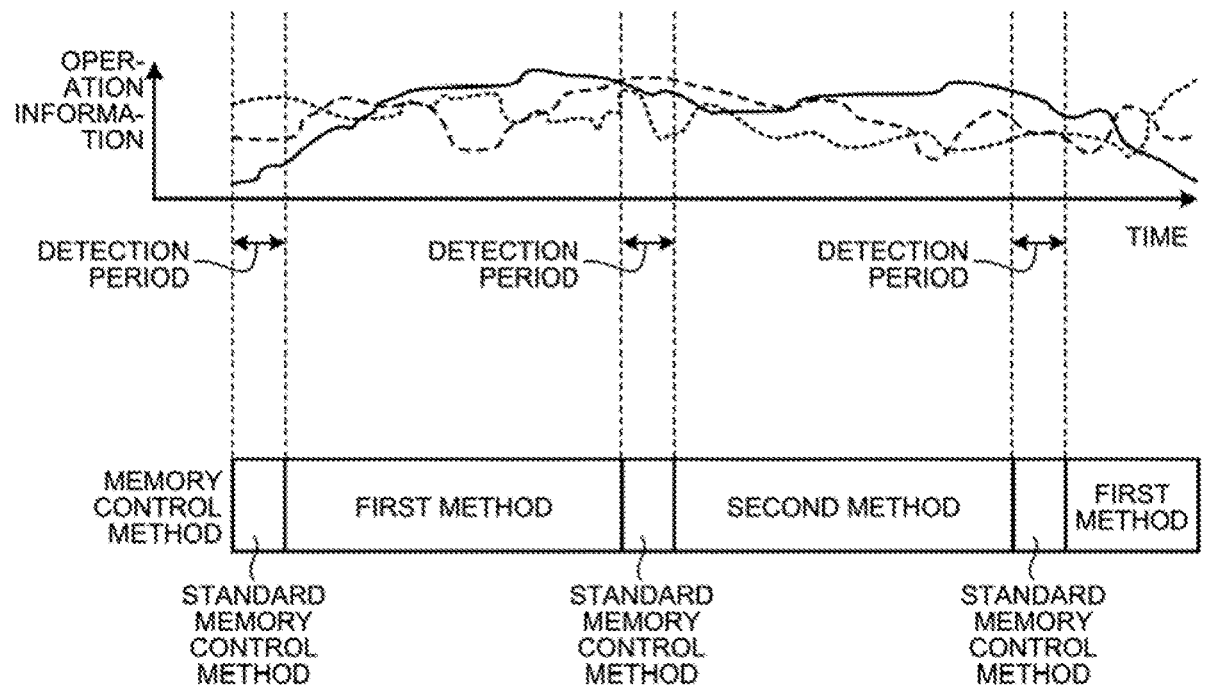
FIG. 8 is a diagram illustrating a waveform chart of operation information, and an example of selected memory control methods.

FIG. 8 is a diagram illustrating a waveform chart of operation information, and an example of selected memory control methods. As illustrated in FIG. 8, the method decision unit 36 performs selection and switching of a memory control method at regular periods, for example. The method decision unit 36 sets a detection period immediately before a switching timing of a memory control method, and acquires operation information in the detection period. Then, the method decision unit 36 decides a memory control method based on the acquired operation information, and switches the memory control method to a new memory control method.

In addition, in the example in FIG. 8, the method decision unit 36 sets a memory control method to a standard memory control method in the detection period. Nevertheless, the method decision unit 36 may continue the lastly-set memory control method in the detection period, in a case where a difference in a memory control method does not affect operation information to be acquired.

Figure 9:
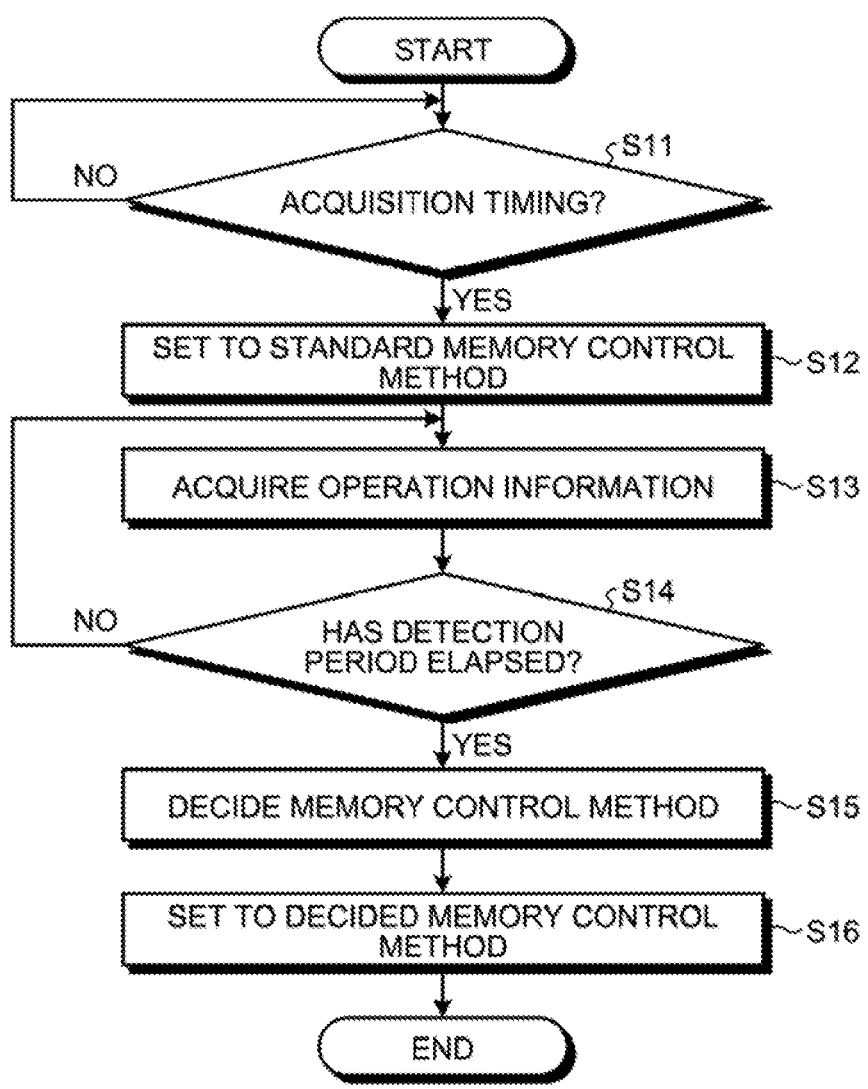
FIG. 9 is a flowchart illustrating a flow of processing performed by the method decision unit.

FIG. 9 is a flowchart illustrating a flow of processing performed by the method decision unit 36. The method decision unit 36 according to the first embodiment executes processing according to the flowchart illustrated in FIG. 9.

First of all, in S11, the method decision unit 36 determines whether an acquisition timing of operation information has come. In a case where the acquisition timing has not come (No in S11), the method decision unit 36 holds the processing in S11. In a case where the acquisition timing has come (Yes in S11), the method decision unit 36 advances the processing to S12.

In S12, the method decision unit 36 performs setting processing for the access management unit 34 so that the management device 22 accesses the first memory unit 14 and the non-volatile memory unit 16 by the standard memory control method. In addition, the method decision unit 36 may continue the lastly-set memory control method in the detection period, in a case where a difference in a memory control method does not affect operation information to be acquired.

Subsequently, in S13, the method decision unit 36 acquires operation information from the operation information detector 24. Subsequently, in S14, the method decision unit 36 determines whether a detection period has elapsed. In a case where the detection period has not elapsed (No in S14), the method decision unit 36 returns the processing to S13, and continues the acquisition of operation information until the detection period elapses. In a case where the detection period has elapsed (Yes in S14), the method decision unit 36 advances the processing to S15.

In S15, the method decision unit 36 decides an optimum memory control method based on the acquired operation information, and a decision model stored in the decision model storage unit 28. For example, the method decision unit 36 decides one appropriate memory control method from among a plurality of memory control methods.

Subsequently, in S16, the method decision unit 36 performs setting processing fox the access management unit 34 so that the management device 22 accesses the first memory unit 14 and the non-volatile memory unit 16 by the decided optimum memory control method. When the processing in S16 ends, the method decision unit 36 ends this flow.

The information processing apparatus 18 having such a configuration causes the method decision unit 36 to select an appropriate memory control method based on the operation information, and causes the management device 22 to access the first memory unit 14 and the non-volatile memory unit 16 by the selected memory control method. According to the information processing apparatus 18, the management device 22 can be thereby operated such that execution performance appropriate for each application program to be executed can be obtained, for example.

Figure 10:
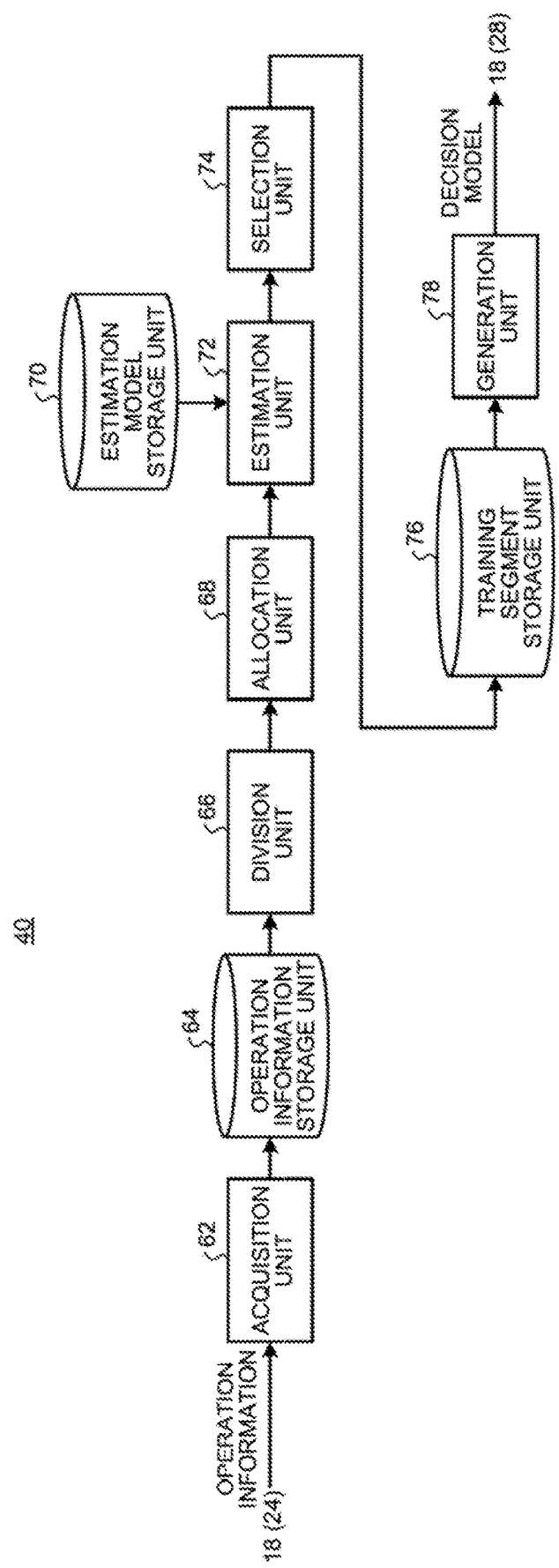
FIG. 10 is a diagram illustrating a configuration of a model generation apparatus.

FIG. 10 is a diagram illustrating a configuration of the model generation apparatus 40. The model generation apparatus 40 includes an acquisition unit 62, an operation information storage unit 64, a division unit 66, an allocation unit 68, an estimation model storage unit 70, an estimation unit 72, a selection unit 74, a training segment storage unit 76, and a generation unit 78.

The acquisition unit 62 acquires time-series data of operation information that is obtainable in a case where the information processing apparatus 18 is operated, from the operation information detector 24 of the information processing apparatus 13. For example, the acquisition unit 62 acquires time-series data of operation information of the information processing apparatus 18 that has executed an application program. For example, the acquisition unit 62 acquires time-series data of operation information in all execution periods of the application program. The acquisition unit 62 writes the acquired time-series data of operation information into the operation information storage unit 64. The operation information storage unit 64 stores the time-series data of operation information that has been acquired by the acquisition unit 62.

The division unit 66 generates a plurality of segments by dividing the time-series data of operation information that is stored in the operation information storage unit 64, in a time direction. In addition, the division unit 66 generates, for each of a plurality of division patterns different from each other, a plurality of segments by dividing the time-series data of operation information according to a corresponding division pattern. The division unit 66 may generate a plurality of segments by dividing the time-series data of operation information by a certain time or a certain number of commands. In addition, the division unit 66 may generate a plurality of segments by dividing time-series data of operation information at non-uniform intervals.

The allocation unit 68 allocates any one memory control method of a plurality of memory control methods to each of the plurality of segments divided by the division unit 66. In addition, in a case where a plurality of segments are generated for each of a plurality of division patterns, the allocation unit 68 allocates a memory control method for each of the plurality of division patterns and for each of the plurality of segments. The allocation unit 68 may select one memory control method at random from among a plurality of allocatable memory control methods, and allocate the selected memory control method to a segment. In addition, the allocation unit 68 may select one memory control method from among a plurality of allocatable memory control methods based on a predetermined rule, and allocate the selected memory control method to a segment.

The estimation model storage unit 70 stores, from the operation information, an estimation model for estimating execution performance of memory access to the first memory unit 14 and the non-volatile memory unit 16. The estimation model is an arithmetic expression for calculating, from the operation information, execution performance (e.g. execution time, power consumption, or lifetime decrease amount) of each of a plurality of memory control methods, for example. The estimation model may be a decision tree, linear regression, a neural network, a support vector machine, and the like, for example.

The estimation unit 72 estimates, for each of the plurality of division patterns and for each of the plurality of segments, execution performance of memory access to the first memory unit 14 and the non-volatile memory unit 16 that is obtainable in a case where the information processing apparatus 18 executes processing of a corresponding segment by an allocated memory control method. In this case, the estimation unit 72 estimates execution performance for the allocated memory control method based on the corresponding segment, and the estimation model stored in the estimation model storage unit 70.

For example, the estimation unit 72 may estimate, as execution performance, an execution time taken in a case where the information processing apparatus 18 executes processing of the corresponding segment by the allocated memory control method. In addition, for example, the estimation unit 72 may estimate, as execution performance, power consumption taken in a case where the information processing apparatus 18 executes processing of the corresponding segment by the allocated memory control method. In addition, for example, the estimation unit 72 may estimate, as execution performance, a lifetime decrease amount (abrasion degree) obtainable in a case where the information processing apparatus 18 executes processing of the corresponding segment by the allocated memory control method.

The selection unit 74 selects, from among a plurality of segments included in the plurality of division patterns, a plurality of training segments in which estimated execution performance satisfies a predefined condition. For example, the selection unit 74 selects a plurality of training segments from among a plurality of segments having execution performance better than a reference value. In addition, for example, the selection unit 74 may select a division pattern in which a total value of execution performances estimated for a plurality of included segments is better than the reference value, and select a training segment from among a plurality of segments included in the selected division pattern.

The reference value may be preset by a designer. In addition, the reference value may be set based on statistical information obtained from execution performances estimated for a plurality of segments. For example, the reference value may be an average value of execution performances, may be a value obtained by multiplying the average value by a predetermined number, or may be a value dividing segments with higher 10% of execution performances and segments with lower 90% of execution performances.

The selection unit 74 writes a set of the selected educator segment and a memory control method allocated to the educator segment, into the educator segment storage unit 76. The educator segment storage unit 76 stores a plurality of training segments, and memory control methods respectively allocated to the plurality of training segments, in association with each other.

The generation unit 78 generates a decision model for deciding a memory control method based on operation information, based on the plurality of training segments stored in the educator segment storage unit 76, and memory control methods respectively allocated to the plurality of training segments.

The decision model includes an aggregate of sets of training segments and allocated memory control methods. In this case, for example, the method decision unit 36 in the information processing apparatus 18 detects a training segment closest to operation information extracted in the detection period, from the aggregate included in the decision model, and outputs a memory control method allocated to the detected educator segment.

In addition, the generation unit 78 may convert a training segment into vector information represented by a plurality of feature parameters, by performing arithmetic processing on one or a plurality of parameters of operation information that are included in the educator segment. In this case, the decision model includes an aggregate of sets of vector information pieces representing training segments, and allocated memory control methods. Then, for example, the method decision unit 36 in the information processing apparatus 18 converts operation information extracted in the detection period, into vector information, detects vector information of the closest educator segment from the aggregate included in the decision model, and outputs a memory control method allocated to the detected vector information of the educator segment.

In addition, furthermore, the generation unit 78 may cluster vector information pieces of a plurality of training segments, and generate a decision model represented by a decision tree, linear regression, a neural network, a support vector machine, and the like. In this case, the method decision unit 36 grants operation information extracted in the detection period, or vector information of the operation information, to the decision model, and outputs a memory control method obtained from the decision model.

The generation unit 78 registers such a decision model into the decision model storage unit 28 of the information processing apparatus 18.

Figure 11:
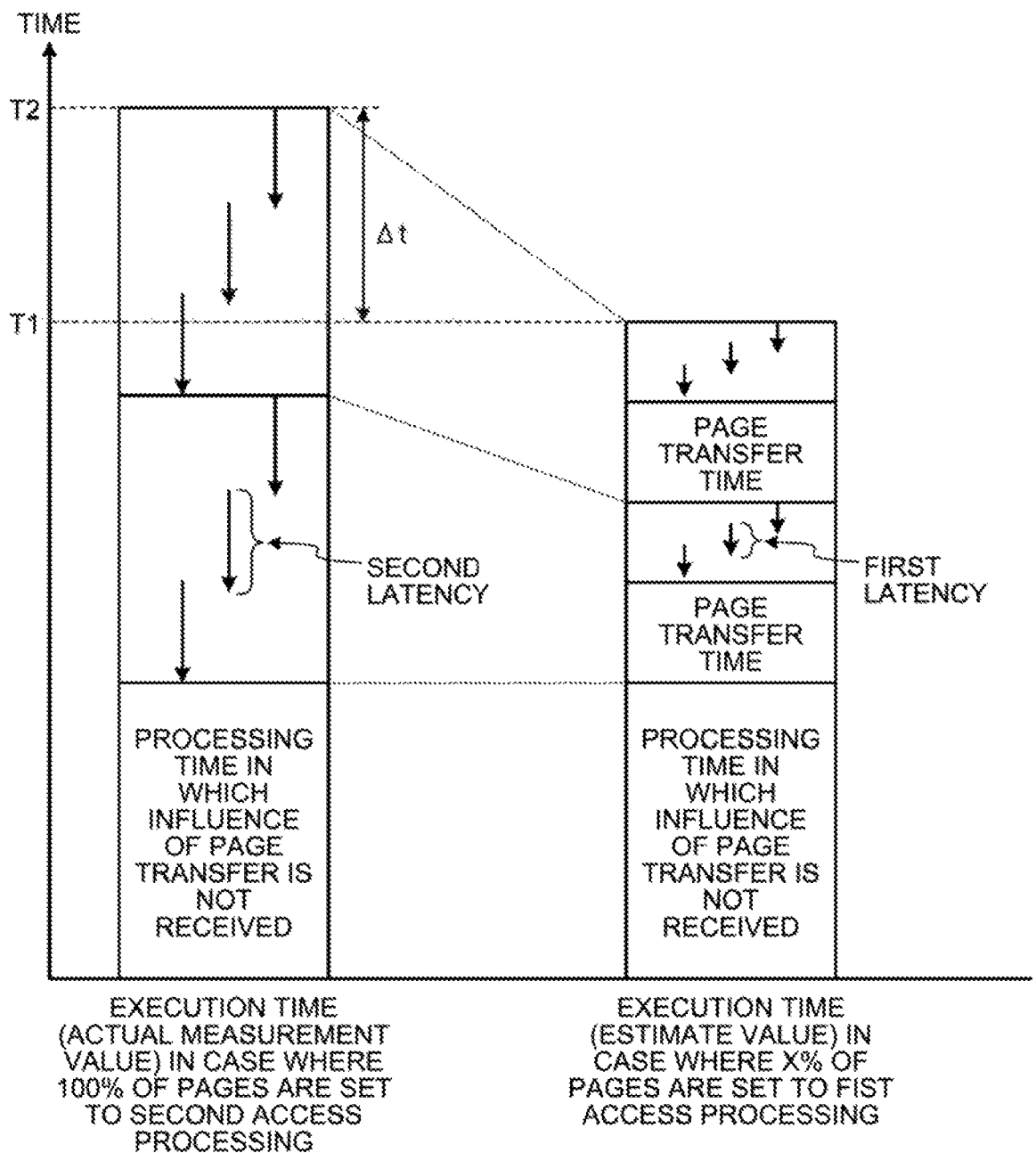
FIG. 11 is a diagram for describing a calculation processing example of an execution time.

FIG. 11 is a diagram for describing a calculation processing example of an execution time. In the case of estimating an execution time as execution performance, the acquisition unit 62 acquires actual measurement values of the number of memory accesses, the number of accessed pages, and an execution time. Then, the estimation unit 72 substitutes the actual measurement values of the number of memory accesses, the number of pages, and the execution time into a predefined estimation model (e.g. arithmetic expression), and calculates an estimate value of an execution time for an allocated memory control method.

For example, in the case of estimating an execution time taken in a case where the management device 22 is operated by a memory control method in which 100% of pages are set to the second access processing, and the management device 22 is operated by a memory control method in which 100% of pages are set to the first access processing, the estimation unit 72 calculates formulae represented by the following formulae (1) and (2), to calculate an execution time.

$$T1 = T2 - \Delta t \quad (1)$$

$$\Delta t = (N_A \times (L_S - L_D)) - (N_P \times T) \quad (2)$$

In Formula (1), T1 denotes an estimate value of an execution time taken in a case where the management device 22 is operated by the memory control method in which 100% of pages are set to the first access processing. T2 denotes an actual measurement value of an execution time that is obtainable in a case where the management device 22 is operated by the memory control method in which 100% of pages are set to the second access processing.

In addition, in Formula (2), $N_A$ denotes the number of memory accesses. $N_P$ denotes the number of accessed pages.

In addition, in Formula (2), $L_D$ denotes latency of memory access to the first memory unit 14. $L_S$ denotes latency of memory access to the non-volatile memory unit 16. In addition, T denotes a transfer time required for transferring data corresponding to one page, from the non-volatile memory unit 16 to the first memory unit 14. $L_D$, $L_S$, and T are values measured in advance, and incorporated into an estimation model as constants.

Thus, for example, the estimation model storage unit 70 stores the arithmetic expressions represented by Formulas (1) and (2) described above, as an estimation model. The estimation unit 72 acquires actual measurement values of the number of memory accesses, the number of pages, and the execution time that are obtainable in a case where the management device 22 is operated by the memory control method in which 100% of pages are set to the second access processing. Then, the estimation unit 72 estimates an execution time taken in a case where the management device 22 is operated by the memory control method in which 100% of pages are set to the first access processing, based on the arithmetic expressions represented by Formulae (1) and (2) described above, and the actual measurement values of the number of memory accesses, the number of pages, and the execution time.

In addition, in the case of estimating an execution time taken in a case where the management device 22 is operated by a memory control method in which X % of pages (X is a value larger than 0 and smaller than 100) are set to the first access processing, the estimation unit 72 performs the following processing.

First of all, the estimation unit 72 acquires actual measurement values of the number of memory accesses, the number of pages, and the execution time that are obtainable in a case where the management device 22 is operated by the memory control method in which 100% of pages are set to the second access processing. Subsequently, the estimation unit 72 selects higher X % of pages with large numbers of accesses, from among accessed pages. The estimation unit 72 substitutes the number of the selected X % of pages, into $N_P$ in Formula (2).

Furthermore, the estimation unit 72 calculates the number of memory accesses to the selected X % of pages. The estimation unit 72 substitutes the calculated number of memory accesses to X % of pages, into $N_A$ in Formula (2). Then, the estimation unit 72 calculates an execution time by calculating the formulae represented by Formulae (1) and (2) described above. The estimation unit 72 can thereby estimate an execution time taken in a case where the management device 22 is operated by the memory control method in which X % of pages are set to the first access processing.

Figure 12:
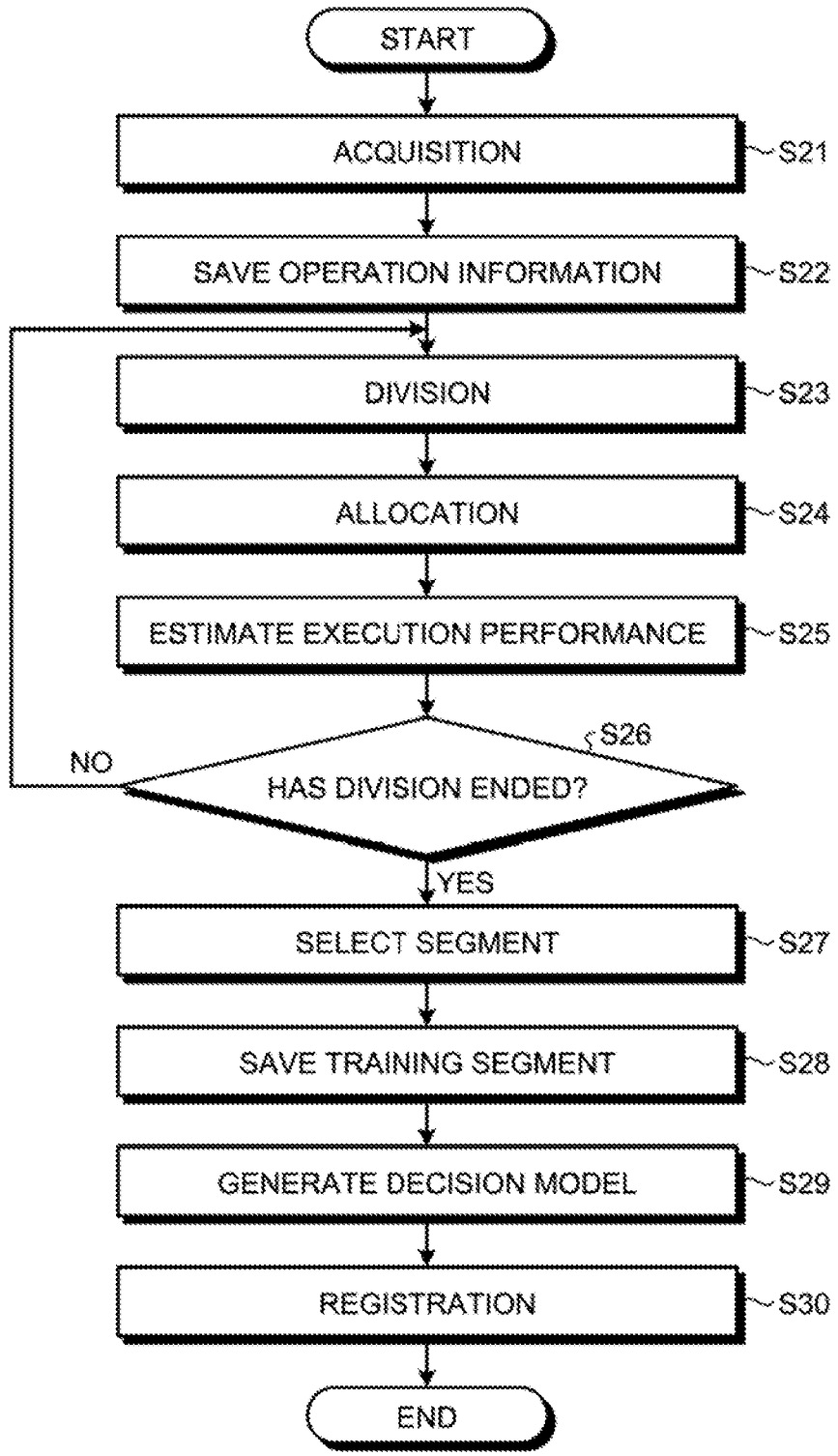
FIG. 12 is a flowchart illustrating a flow of processing performed by the model generation apparatus.

FIG. 12 is a flowchart illustrating a flow of processing performed by the model generation apparatus 40. The model generation apparatus 40 according to the first embodiment executes processing according to the flowchart illustrated in FIG. 12. The processing in each step in the flowchart in FIG. 12 will be described below with reference to FIGS. 13 to 20.

First of all, in S21, the model generation apparatus 40 causes the information processing apparatus 18 to execute an application program, and acquires time-series data of operation information from the information processing apparatus 18. For example, the model generation apparatus 40 acquires time-series data of operation information in all execution periods of the application program.

In this case, the model generation apparatus 40 performs setting processing for the information processing apparatus 18 so that the management device 22 of the information processing apparatus 18 accesses the first memory unit 14 and the non-volatile memory unit 16 by the standard memory control method. For example, the model generation apparatus 40 causes the information processing apparatus 18 to set access methods for all the pages to be accessed, to the second access processing. In addition, the model generation apparatus 40 may set a memory control method to any memory control method as long as the set memory control method is a memory control method in which operation information that can estimate execution performance by the estimation model can be obtained. In a case where operation information acquired in S21 is not to be affected by a difference in a memory control method, the model generation apparatus 40 may set any memory control method.

Figure 13:
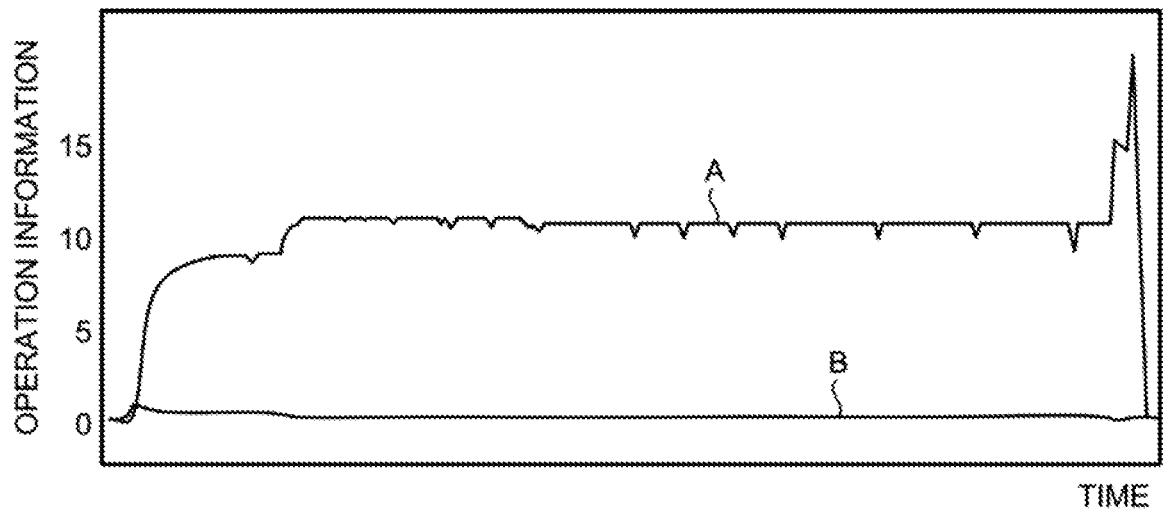
FIG. 13 is a diagram illustrating an example of time-series data of operation information that has been acquired in S21.

FIG. 13 is a diagram illustrating an example of time-series data of operation information that has been acquired in S21. For example, in S21, the model generation apparatus 40 acquires operation information as illustrated in FIG. 13. Time-series data of a parameter indicating a cache mistake of the L3 cache is denoted by "A" in FIG. 13. In addition, time-series data of a parameter indicating a stall time of the L2 cache is denoted by "B" in FIG. 13. The model generation apparatus 40 may further acquire other parameters as operation information, or may acquire a parameter other than the parameters illustrated in FIG. 13, as operation information.

Subsequently, in S22, the model generation apparatus 40 saves the acquired time-series data of operation information. The model generation apparatus 40 can thereby store time-series data of operation information in all execution periods of the application program, for example.

Subsequently, in S23, the model generation apparatus 40 generates a plurality of segments by dividing the time-series data of operation information in the time direction. In addition, the model generation apparatus 40 repeatedly divides the time-series data of operation information in the time direction, until it is determined in S26 to be described later, that division is to be ended. In this case, the model generation apparatus 40 generates a plurality of segments by dividing the time-series data of operation information in a plurality of division patterns different from each other.

Figure 14:
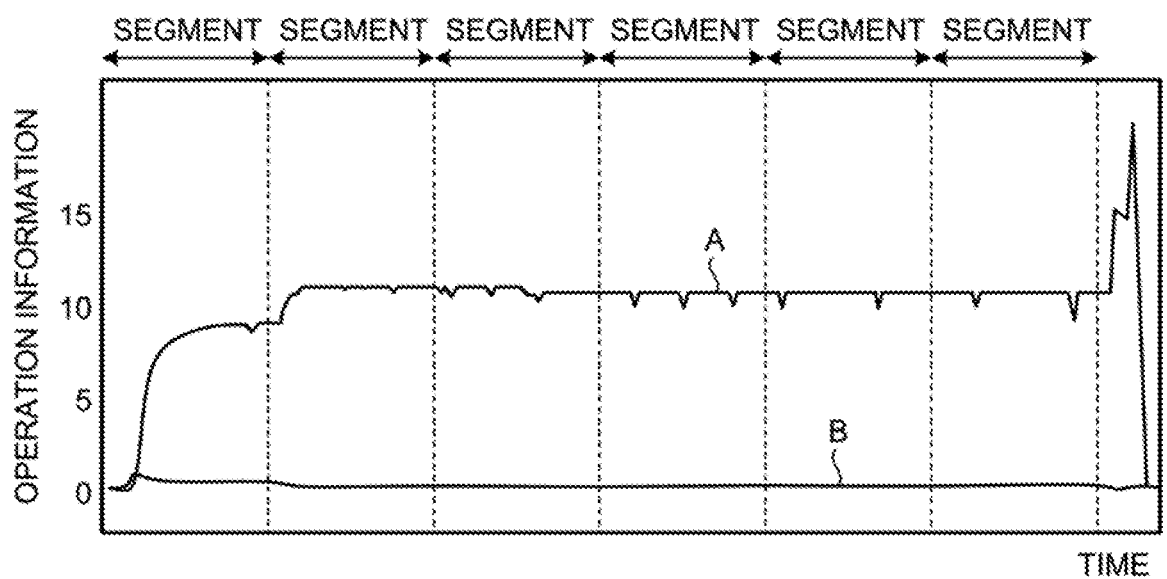
FIG. 14 is a diagram illustrating a first example of a plurality of segments divided in S23.
Figure 15:
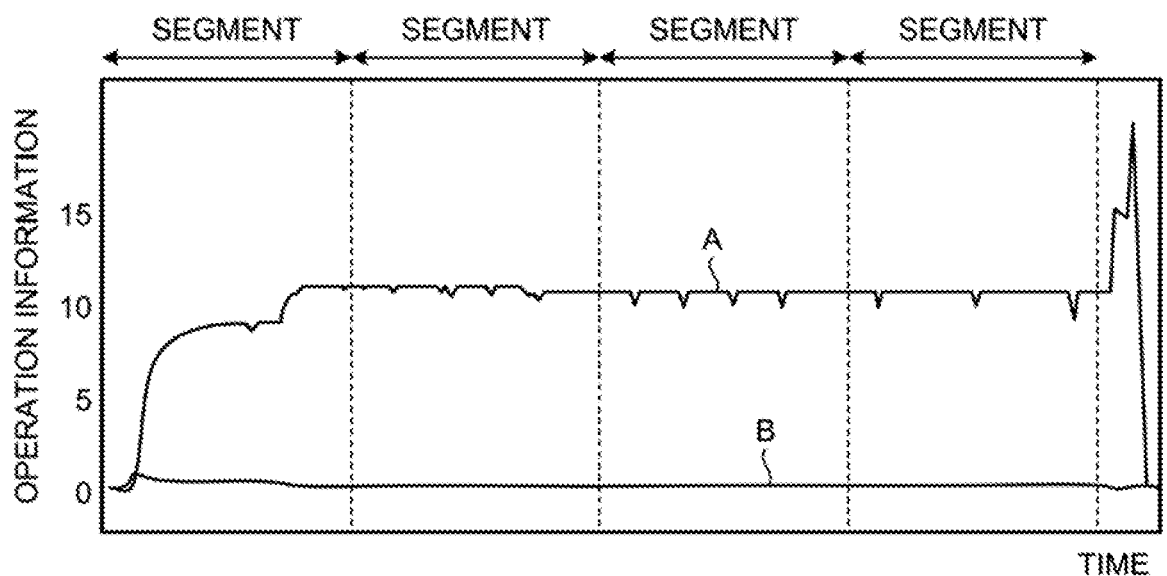
FIG. 15 is a diagram illustrating a second example of a plurality of segments divided in S23.
Figure 16:
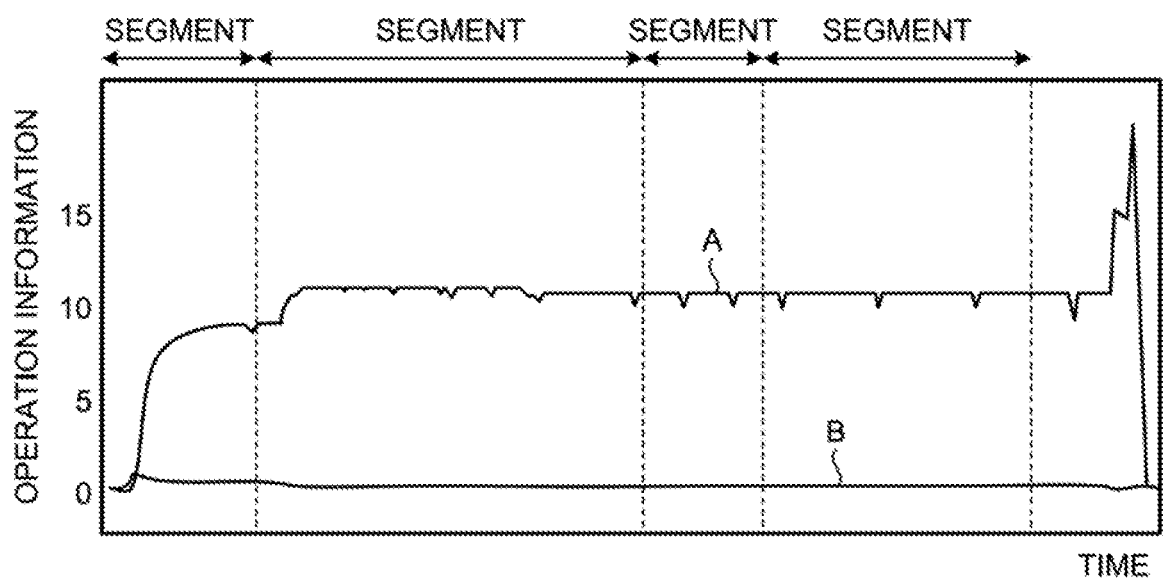
FIG. 16 is a diagram illustrating a third example of a plurality of segments divided in S23.

FIG. 14 is a diagram illustrating a first example of a plurality of segments divided in S23. FIG. 15 is a diagram illustrating a second example of a plurality of segments divided in S23. FIG. 16 is a diagram illustrating a third example of a plurality of segments divided in S23.

For example, the model generation apparatus 40 may generate a plurality of segments by dividing the time-series data of operation information at regular time intervals as illustrated in FIGS. 14 and 15. In addition, the model generation apparatus 40 may generate a plurality of segments by dividing the time-series data of operation information at non-uniform intervals as illustrated in FIG. 16. For example, the model generation apparatus 40 may select a division pattern at random from among a plurality of division patterns prepared in advance, or may generate a division pattern at random in each time.

In addition, the model generation apparatus 40 may search for a division position based on a past division pattern so as to increase a probability at which a training segment is selected in segment selection processing in S27. For example, the model generation apparatus 40 may search for a division position using dynamic programming or the like. In addition, in the case of generating a division pattern so as to increase a probability at which a training segment is selected in the segment selection processing in S27, the model generation apparatus 40 executes processing in S26 to be described later, after S28.

Subsequently, in S24, the model generation apparatus 40 allocates any one memory control method of a plurality of memory control methods to each of the plurality of divided segments. The model generation apparatus 40 may select one memory control method at random from among a plurality of allocatable memory control methods, and allocate the selected memory control method to each of the plurality of divided segments, for example. In addition, the model generation apparatus 40 may select one memory control method from among a plurality of allocatable memory control methods based on a predetermined rule, and allocate the selected memory control method to each of the plurality of divided segments. In addition, the model generation apparatus 40 may select, for each of the plurality of divided segments, a memory control method estimated to be appropriate, with reference to a value of a parameter included in a corresponding segment, and allocate the selected memory control method.

Figure 17:
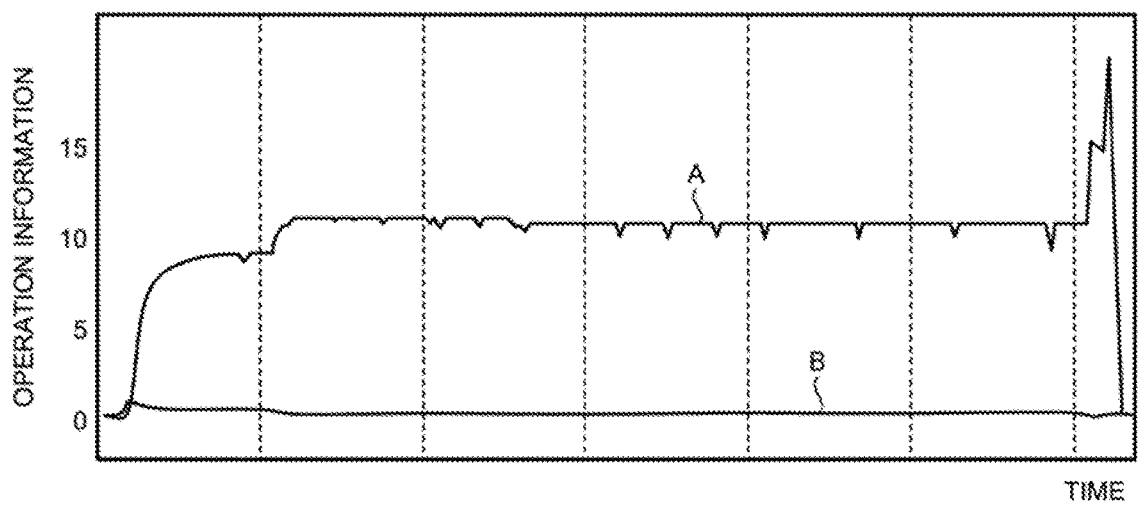
FIG. 17 is a diagram illustrating an example of a memory control method allocated in S24.

FIG. 17 is a diagram illustrating an example of a memory control method allocated in S24. For example, the model generation apparatus 40 allocates one memory control method selected from among two allocatable memory control methods (first method and second method), to each of a plurality of segments as illustrated in FIG. 17.

Subsequently, in S25, the model generation apparatus 40 estimates, for each of the plurality of division patterns, execution performance of memory access to the first memory unit 14 and the non-volatile memory unit 16 that is indicated in a case where the information processing apparatus 18 executes processing of a corresponding segment by an allocated memory control method. In this case, the model generation apparatus 40 estimates execution performance for the allocated memory control method based on the corresponding segment, and the estimation model stored in the estimation model storage unit 70.

Figure 18:
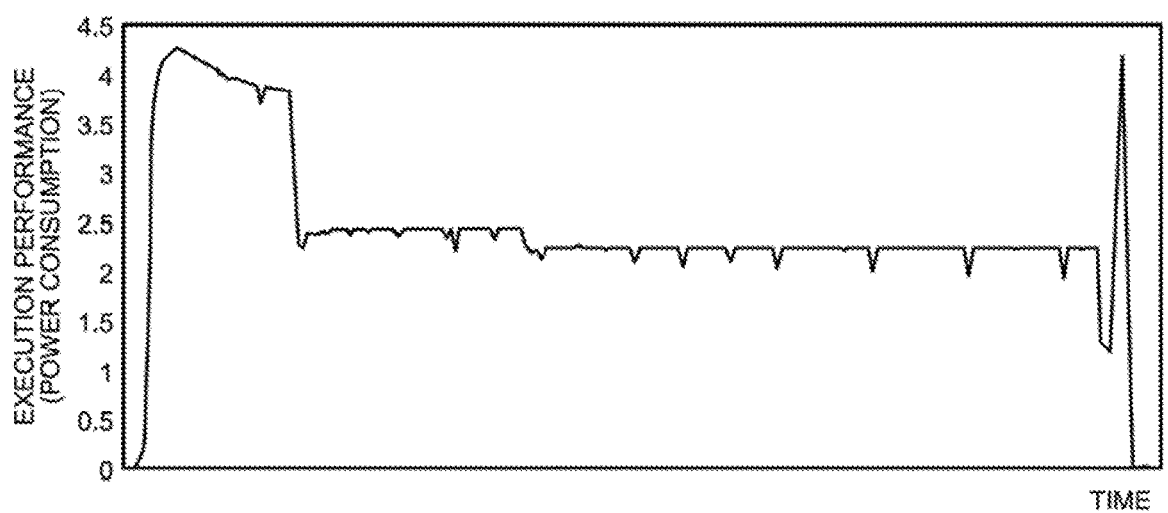
FIG. 18 is a diagram illustrating an example of execution performance estimated in S25.

FIG. 18 is a diagram illustrating an example of execution performance estimated in S25. For example, in S25, the model generation apparatus 40 estimates, as execution performance, power consumption taken in a case where the information processing apparatus 18 executes processing of a segment by the allocated memory control method, as illustrated in FIG. 18. In addition, for example, the model generation apparatus 40 may estimate, as execution performance, an execution time or a lifetime decrease amount (abrasion degree) that is obtainable in a case where the information processing apparatus 18 executes processing of a segment by the allocated memory control method. In addition, FIG. 18 illustrates time-series data of execution performance, but the information processing apparatus 18 may calculate a total value of execution performances for each segment.

Subsequently, in S26, the model generation apparatus 40 determines whether segment division processing has ended. For example, in a case where loop processing from S23 to S26 has been executed a predefined number of times, the model generation apparatus 40 determines that the segment division processing has ended. In addition, for example, in a case where the loop processing from S23 to S26 has been executed for a predefined time, the model generation apparatus 40 may determine that the segment division processing has ended. In addition, in a case where the total number of generated segments exceeds a predefined number, the model generation apparatus 40 may determine that the segment division processing has ended. In addition, for example, in a case where the total number of training segments selected in S27 exceeds a predefined number, the model generation apparatus 40 may determine that the segment division processing has ended. In addition, in the case of determining whether the total number of training segments selected in S27 exceeds a predefined number, the model generation apparatus 40 executes the processing in S26 after S28.

In a case where the segment division processing has not ended (No in S26), the model generation apparatus 40 returns the processing to S23, and repeats the processing from S23. In a case where the segment division processing has ended (Yes in S26), the model generation apparatus 40 advances the processing to S27.

In S27, the model generation apparatus 40 selects, from among a plurality of segments included in the plurality of division patterns, a plurality of training segments in which estimated execution performance satisfies a predefined condition. For example, the model generation apparatus 40 selects a plurality of training segments from among a plurality of segments having execution performance better than a reference value.

Figure 19:
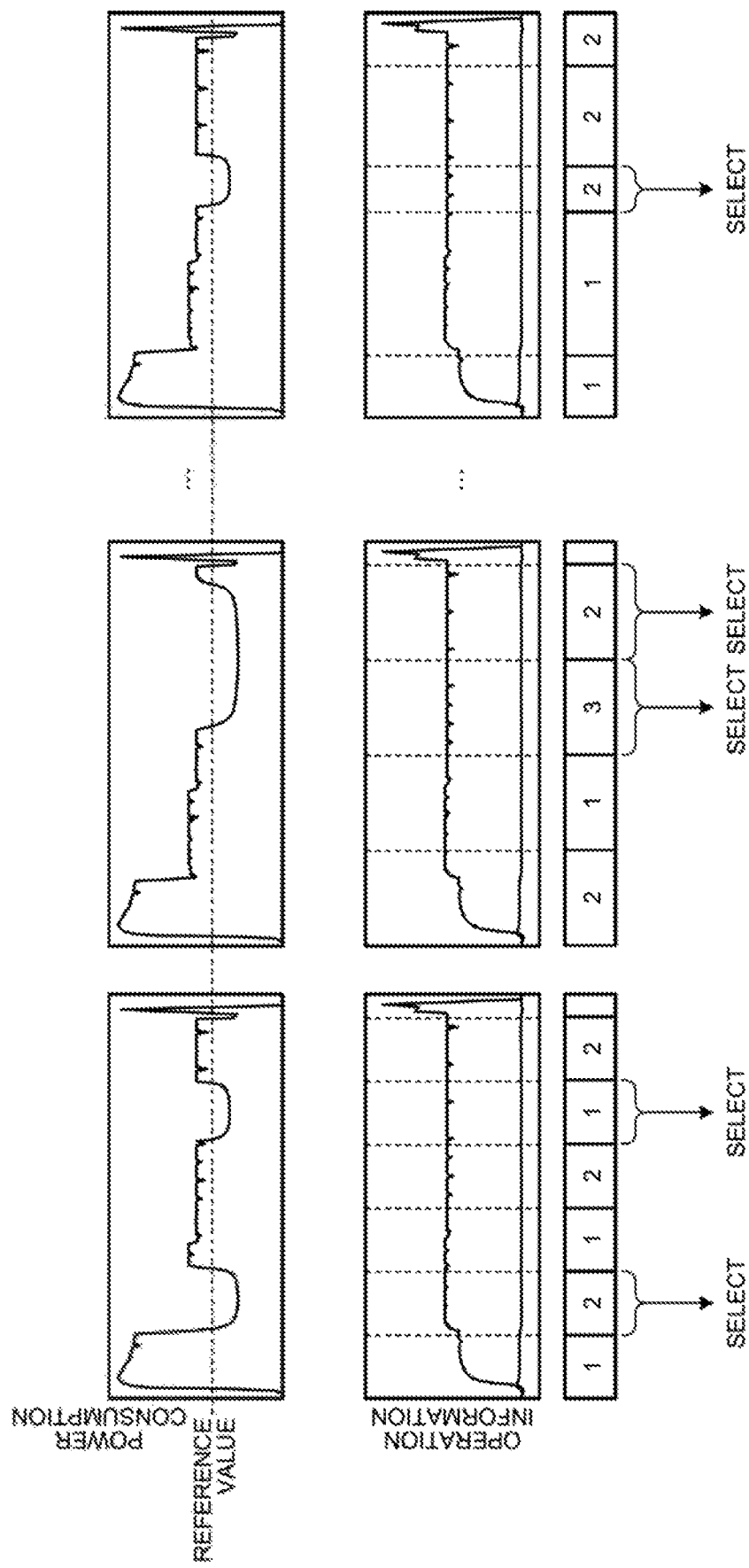
FIG. 19 is a diagram illustrating an example of a plurality of segments selected in S27.

FIG. 19 is a diagram illustrating an example of a plurality of segments selected in S27. For example, in S27, the model generation apparatus 40 may select, as a training segment, a segment having power consumption falling below a reference value, as illustrated in FIG. 19.

Subsequently, in S28, the model generation apparatus 40 saves a set of the selected educator segment, and a memory control method allocated to the educator segment. The model generation apparatus 40 can thereby store a plurality of training segments, and memory control methods respectively allocated to the plurality of training segments, in association with each other.

Subsequently, in S29, the model generation apparatus 40 generates a decision model based on the plurality of saved training segments and memory control methods respectively allocated to the plurality of training segments. The decision model includes an aggregate of sets of training segments and memory control methods.

Figure 20:
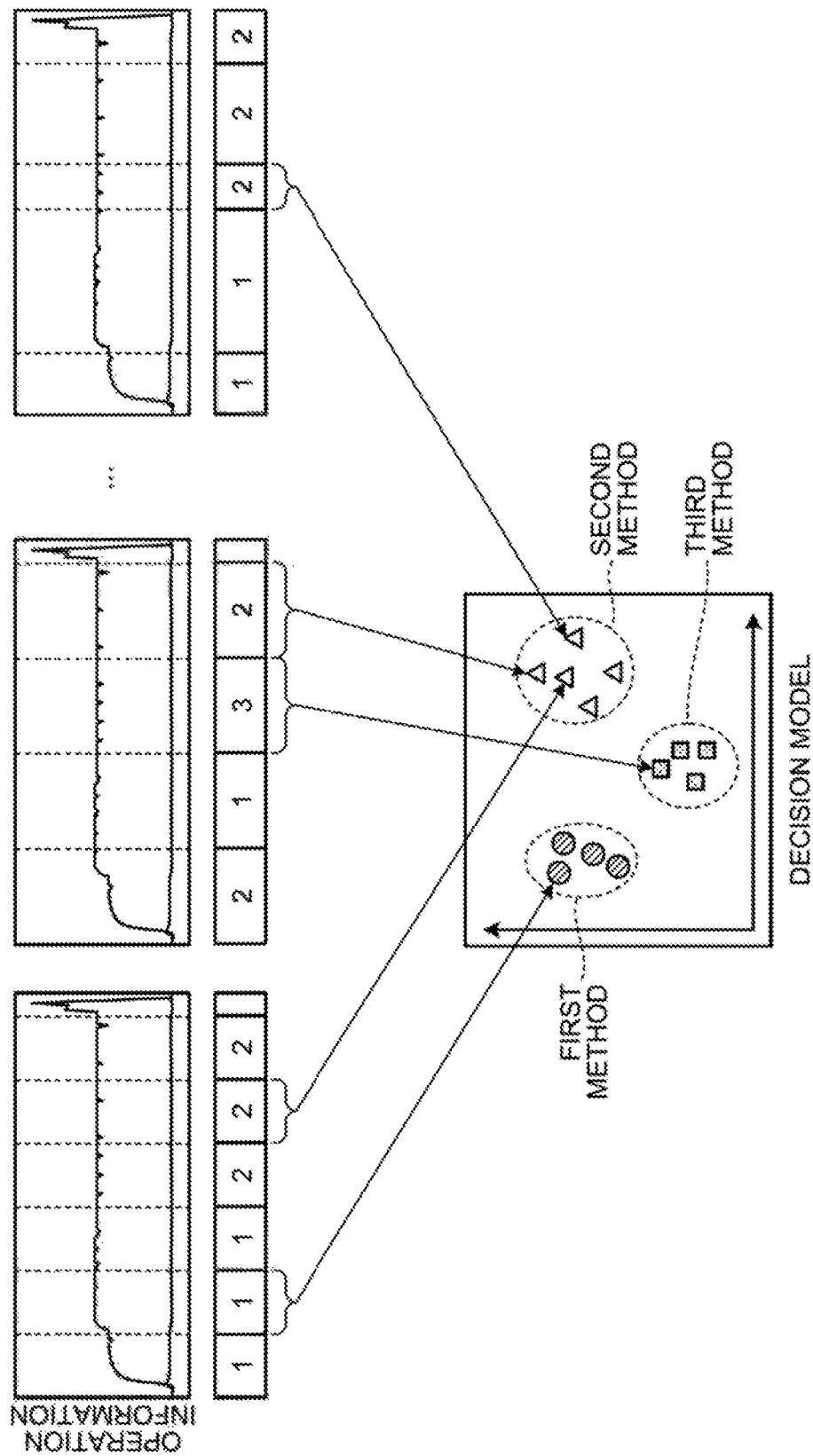
FIG. 20 is a diagram illustrating an example of a decision model generated in S29.

FIG. 20 is a diagram illustrating an example of a decision model generated in S29. As illustrated in FIG. 20, the model generation apparatus 40 may perform arithmetic processing on each parameter of operation information that is included in the educator segment, and convert the educator segment into vector information represented by a plurality of feature parameters. Then, the model generation apparatus 40 may generate a decision model including an aggregate of sets of training segments represented by such vector information pieces, and memory control methods.

In addition, the model generation apparatus 40 may cluster vector information pieces of a plurality of training segments, and generate a decision model represented by a decision tree, linear regression, a neural network, a support vector machine, and the like. By generating such a decision model, the information processing apparatus 18 can decide an optimum memory control method from acquired operation information.

Subsequently, in S30, the model generation apparatus 40 registers the generated decision model into the decision model storage unit 28 of the information processing apparatus 18. When the processing in S30 ends, the model generation apparatus 40 ends this flow.

As described above, the model generation apparatus 40 selects a plurality of training segments from among a number of segments, and generates a decision model for deciding a memory control method from operation information based on the selected plurality of training segments. Then, the model generation apparatus 40 registers the generated decision model into the information processing apparatus 18. The model generation apparatus 40 can thereby cause the information processing apparatus 18 to access the first memory unit 14 and the non-volatile memory unit 16 by an appropriate memory control method.

First Modified Example

Next, a model generation apparatus 40 according to a first modified example will be described.

Figure 21:
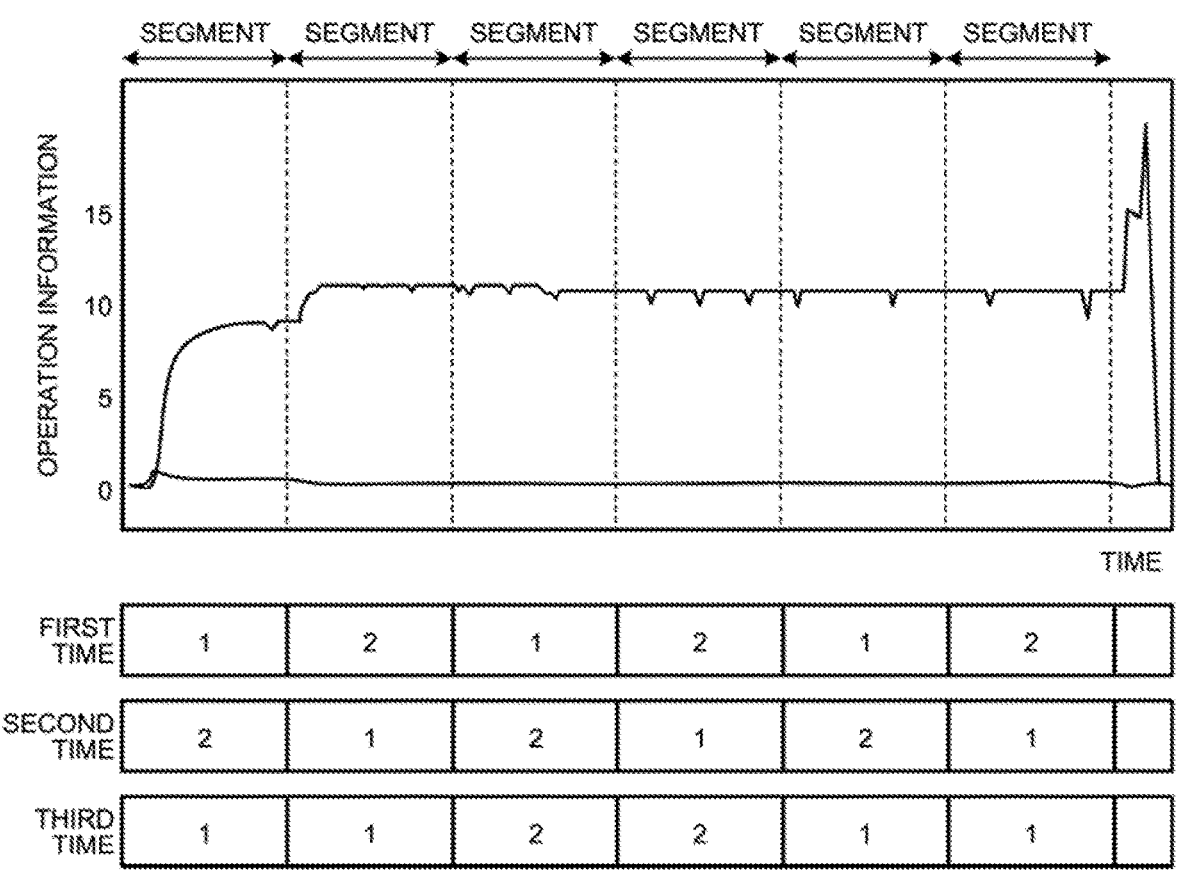
FIG. 21 is a diagram illustrating an example of a memory control method allocated in a first modified example.

FIG. 21 is a diagram illustrating an example of a memory control method allocated in the first modified example. In the first modified example, as illustrated in FIG. 21, the allocation unit 68 of the model generation apparatus 40 allocates memory control methods to each of a plurality of segments divided in the same division pattern, by a plurality of different allocation patterns. Then, in the first modified example, the estimation unit 72 of the model generation apparatus 40 estimates, for each of a plurality of division patterns and for each of the plurality of allocation patterns, execution performance of each of the plurality of corresponding segments.

Figure 22:
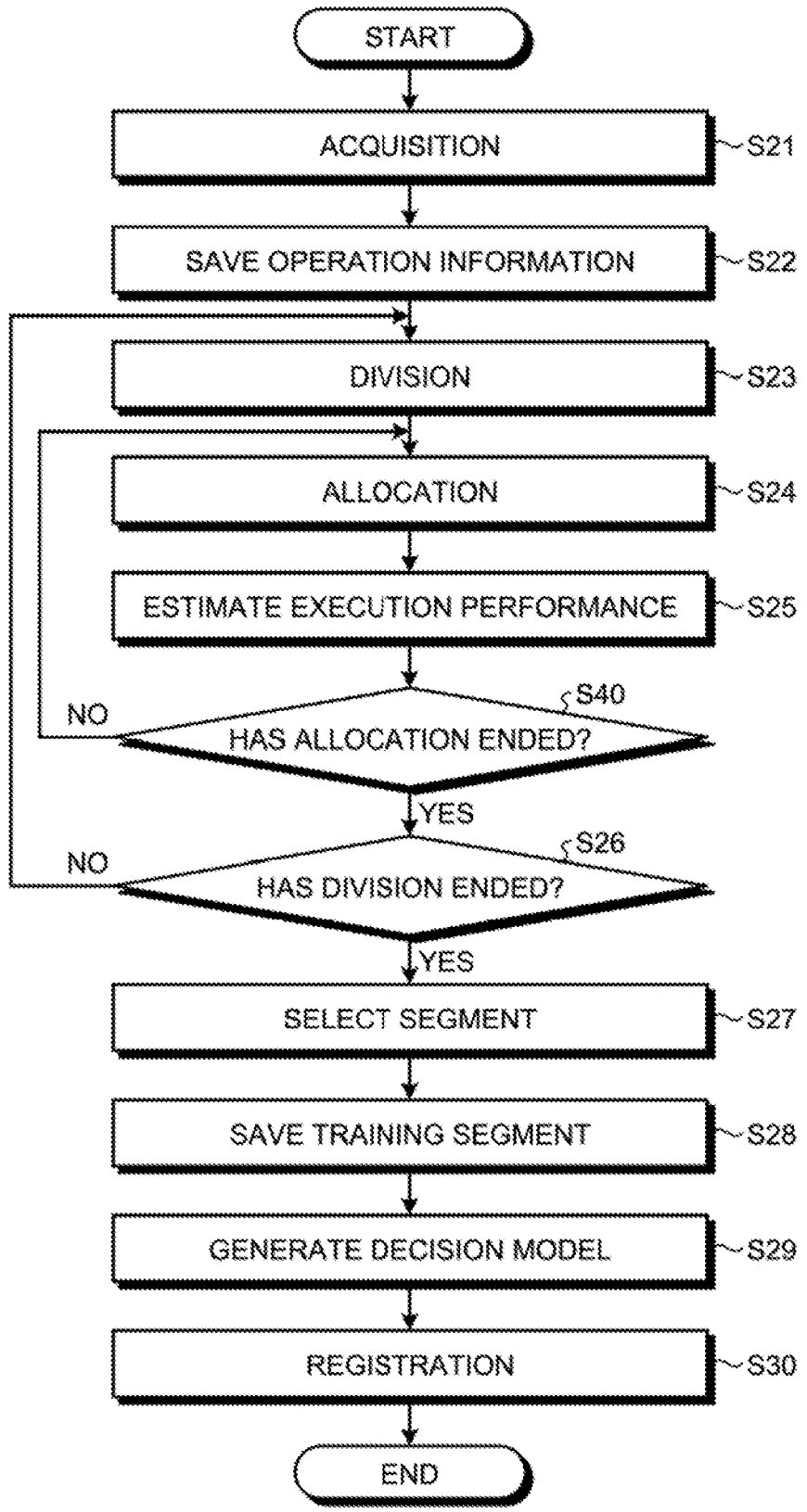
FIG. 22 is a flowchart illustrating a flow of processing performed by a model generation apparatus of the first modified example.

FIG. 22 is a flowchart illustrating a flow of processing performed by the model generation apparatus 40 according to the first modified example. The model generation apparatus 40 according to the first modified example further executes processing in S40 between S25 and S26.

In S40, the model generation apparatus 40 determines whether allocation processing has ended. For example, in a case where loop processing from S24 to S40 has been executed a predefined number of times, the model generation apparatus 40 determines that the allocation processing has ended. In addition, for example, in a case where the loop processing from S24 to S40 has been executed for a predefined time, the model generation apparatus 40 may determine that the allocation processing has ended.

In a case where the allocation processing has not ended (No in S40), the model generation apparatus 40 returns the processing to S24, and repeats the processing from S24. In a case where the processing is returned to S24, the model generation apparatus 40 allocates memory control methods respectively to a plurality of divided segments in a pattern different from patterns allocated to the same division pattern so far. Then, in a case where the allocation processing has ended (Yes in S40), the model generation apparatus 40 advances the processing to S26.

The model generation apparatus 40 according to the first modified example allocates a plurality of memory control methods to one segment. Thus, the model generation apparatus 40 can increase a probability at which a training segment can be selected. The model generation apparatus 40 can thereby generate a more accurate decision model.

Second Modified Example

Next, an information processing apparatus 18 according to a second modified example will be described.

Figure 23:
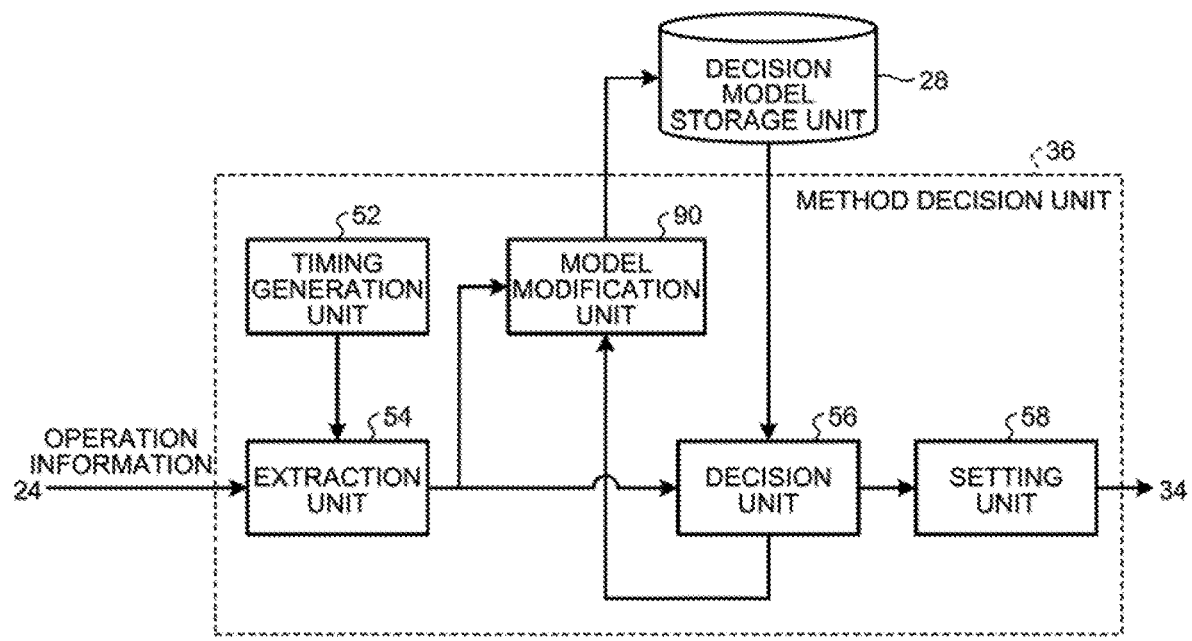
FIG. 23 is a diagram illustrating a configuration of a method decision unit according to a second modified example, together with a decision model storage unit.

FIG. 23 is a diagram illustrating a configuration of a method decision unit 36 according to the second modified example, together with the decision model storage unit 28. The method decision unit 36 according to the second modified example further includes a model modification unit 90. The model modification unit 90 modifies a decision model stored in the decision model storage unit 28, by operation information acquired by the extraction unit 54, and a memory control method decided based on the acquired operation information.

Figure 24:
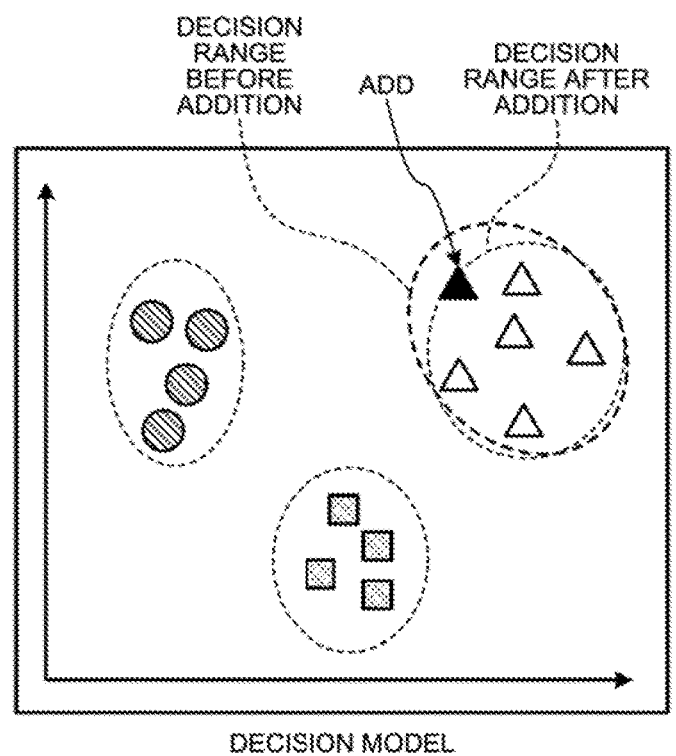
FIG. 24 is a diagram illustrating an example of a decision model to which a training segment is added.

FIG. 24 is a diagram illustrating an example of a decision model to which a training segment is added in the second modified example. For example, in a case where a decision model is an aggregate of sets of training segments and allocated memory control methods, the model modification unit 90 sets the acquired operation information as a training segment as illustrated in FIG. 24. Then, the model modification unit 90 forms a set of the educator segment and the decided memory control method, and adds the set to the decision model. The range of the decision model that is decided as the same memory control method is thereby modified by a newly-added educator model.

In addition, in a case where the decision model is an aggregate of sets of vector information pieces of training segments and memory control methods, the model modification unit 90 converts operation information into vector information, and adds a set of the converted vector information and a memory control method to the decision model. In addition, in a case where the decision model is a decision tree, linear regression, a neural network, a support vector machine, or the like, the model modification unit 90 modifies a parameter such as a threshold for branch determination or a weight coefficient that is included in the decision model, based on operation information and a memory control method.

In addition, the model modification unit 90 may modify a decision model based on operation information acquired in a case where the management device 22 accesses the first memory unit 14 and the non-volatile memory unit 16 by a specific memory control method, for example, without modifying a decision model based on all pieces of extracted operation information.

The information processing apparatus 18 according to the second modified example can modify a decision model even after an operation is started baaed on a generated decision model. The information processing apparatus 18 can thereby enhance decision accuracy caused by a decision model.

Second Embodiment

A second embodiment will be described.

Figure 25:
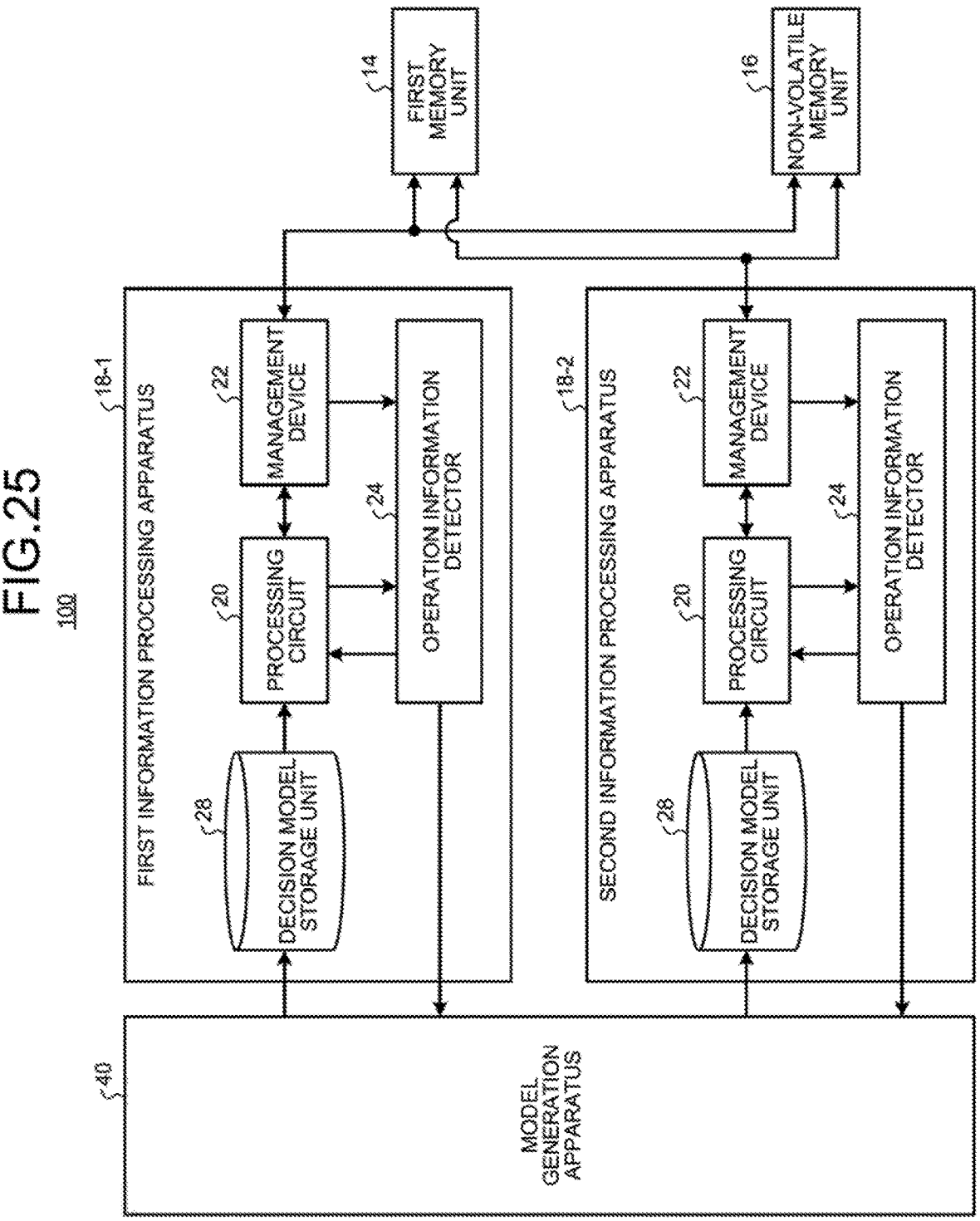
FIG. 25 is a diagram illustrating a configuration of an information processing system according to a second embodiment.

FIG. 25 is a diagram illustrating a configuration of an information processing system 100 according to the second embodiment. The information processing system 100 according to the second embodiment includes the first memory unit 14, the non-volatile memory unit 16, a first information processing apparatus 18-1, a second information processing apparatus 18-2, and the model generation apparatus 40.

The first information processing apparatus 18-1 and the second information processing apparatus 18-2 have the same configuration as the information processing apparatus 18 according to the first embodiment. The first information processing apparatus 18-1 and the second information processing apparatus 18-2 both access the first memory unit 14 and the non-volatile memory unit 16. In other words, the first information processing apparatus 18-1 and the second information processing apparatus 18-2 access a common main storage memory.

The model generation apparatus 40 simultaneously operate the first information processing apparatus 18-1 and the second information processing apparatus 18-2. Then, the model generation apparatus 40 acquires, from the first information processing apparatus 18-1 and the second information processing apparatus 18-2, time-series data of operation information obtained as a result of operating together.

The model generation apparatus 40 generates a decision model to be used by the first information processing apparatus 18-1, based on the time-series data of operation information that has been acquired from the first information processing apparatus 18-1. Then, the model generation apparatus 40 stores the generated decision model into the decision model storage unit 28 included in the first information processing apparatus 18-1.

In addition, the model generation apparatus 40 generates a decision model to be used by the second information processing apparatus 18-2, based on the time-series data of operation information that has been acquired from the second information processing apparatus 18-2. Then, the model generation apparatus 40 stores the generated decision model into the decision model storage unit 28 included in the second information processing apparatus 18-2.

In the information processing system 100, because the first information processing apparatus 18-1 and the second information processing apparatus 18-2 use a common main storage memory, execution performance of memory access affects their operation information pieces. The model generation apparatus 40 according to the second embodiment can generate a decision model to be used by the first information processing apparatus 18-1, based on operation information reflecting influence caused by an operation of the second information processing apparatus 18-2. In addition, the model generation apparatus 40 according to the second embodiment can generate a decision model to be used by the second information processing apparatus 18-2, based on operation information reflecting influence caused by an operation of the first information processing apparatus 18-1.

Hardware Configuration of Information Processing Apparatus 200

Figure 26:
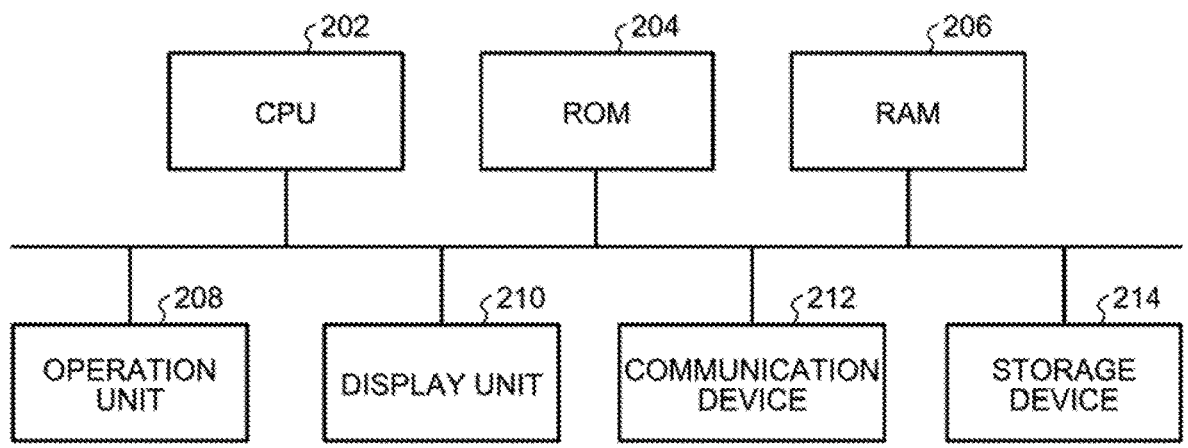
FIG. 26 is a hardware block diagram of an information processing apparatus.

FIG. 26 is a hardware block diagram of an information processing apparatus 200. As an example, the information processing apparatus 200 is implemented by a hardware configuration similar to that of a general computer. The information processing apparatus 200 can function as the model generation apparatus 40 by executing a predetermined program.

The information processing apparatus 200 includes a CPU 202, a Read Only Memory (ROM) 204, a Random Access Memory (RAM) 206, an operation unit 208, a display unit 210, a communication device 212, and a storage device 214. The units are connected by a bus.

The CPU 202 is a processor that executes information processing, and loads programs stored in the storage device 214, onto the RAM 206, executes the programs, performs input and output by controlling each unit, and processes data. The CPU 202 may include one or a plurality of processors. In addition, a processor is not limited to the CPU 202, and the information processing apparatus 200 may include another processor as long as programs can be executed. A start program for reading out a startup program from the storage device 214 onto the RAM 206 is stored in the ROM 204. The RAM 206 stores data as a work area of the CPU 202.

The operation unit 208 is an input device such as a mouse or a keyboard, and receives, as an instruction signal, information operated and input by a user, and outputs the instruction signal to the CPU 202. The display unit 210 is a display device such as a liquid crystal display (LCD), for example. The display unit 210 displays various types of information based on a display signal from the CPU 202. The communication device 212 communicates information with an external device via a network or the like. The storage device 214 is a hard disc drive, a flash memory, or the like, for example. The storage device 214 stores programs and operating systems to be executed by the information processing apparatus 200.

Programs to be executed by the information processing apparatus 200 according to the present embodiment are provided with being recorded on a computer-readable recording medium such as a CD-ROM, a flexible disk (FD), a CD-R, and a DVD, in files having an installable format or an executable format. In addition, programs to be executed by the information processing apparatus 200 according to the present embodiment may be stored on a computer connected to a network such as the Internet, and provided by being downloaded via the network. In addition, programs to be executed by the information processing apparatus 200 according to the present embodiment may be provided or delivered via a network such as the Internet. In addition, the programs of the present embodiment may be provided with being preinstalled on the ROM 204 or the like.

Programs for causing the information processing apparatus 200 to function as the model generation apparatus 40 include an acquisition module, a division module, an allocation module, an estimation module, a selection module, and a generation module. In the information processing apparatus 200, by a processor (CPU 202) reading out programs from a storage medium (storage device 214, etc.), and executing the programs, the modules are loaded onto a main storage device (RAM 206), and the processor (CPU 202) functions as the acquisition unit 62, the division unit 66, the allocation unit 68, the estimation unit 72, the selection unit 74, and the generation unit 78. In addition, the RAM 206, the storage device 214, and the like function as the operation information storage unit 64, the estimation model storage unit 70, and the educator segment storage unit 76. In addition, part of all of these may be implemented by hardware other than the processor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A model generation apparatus for generating a decision model for deciding a memory control method based on operation information used by an information processing apparatus that accesses a volatile memory and a non-volatile memory as main storage memories, the model generation apparatus comprising
a processor circuit configured to:
acquire time-series data of operation information that is obtainable in a case where the information processing apparatus is operated;
divide the time-series data of the operation information in a time direction to generate a plurality of segments;
allocate any one memory control method of a plurality of memory control methods of the main storage memories to each of the plurality of segments;
estimate, for each of the plurality of segments, execution performance of memory access that is obtainable in a case where the information processing apparatus executes processing of a corresponding segment by an allocated memory control method;
select a plurality of training segments in which the estimated execution performance satisfies a predefined condition, from among the plurality of segments; and
generate the decision model based on the selected plurality of training segments and the allocated memory control methods corresponding to the selected plurality of training segments.

2. The model generation apparatus according to claim 1, wherein
the processor circuit is further configured to:
generate, for each of a plurality of division patterns different from each other, the plurality of segments by dividing the time-series data of the operation information according to a corresponding division pattern;
allocate, for each of the plurality of division patterns, a memory control method to each of the plurality of segments;
estimate, for each of the plurality of division patterns, the execution performance of each of the plurality of segments; and
select the plurality of training segments from among a plurality of segments included in the plurality of division patterns.

3. The model generation apparatus according to claim 2, wherein
the processor circuit is further configured to:
allocate, by a plurality of different allocation ratios, memory control methods to each of the plurality of segments divided in a same division pattern; and
estimate, for each of the plurality of division patterns, and for each of the plurality of allocation ratios, the execution performance of each of the plurality of corresponding segments.

4. The model generation apparatus according to claim 1, wherein
the processor circuit is further configured to select the plurality of training segments from among a plurality of segments having the execution performance better than a reference value.

5. The model generation apparatus according to claim 1, wherein
the processor circuit is further configured to select a division pattern in which a total value of the execution performances estimated for a plurality of included segments is better than a reference value, and selects a training segment from among the plurality of segments included in the selected division pattern.

6. The model generation apparatus according to claim 1, further comprising estimation model storage configured to store an estimation model for calculating the execution performance based on the operation information, wherein
the processor circuit is further configured to estimate the execution performance based on the operation information and the estimation model that are included in a corresponding segment.

7. The model generation apparatus according to claim 1, wherein
the processor circuit is further configured to estimate, as the execution performance, power consumption taken in a case where the information processing apparatus executes processing of a corresponding segment by an allocated memory control method.

8. The model generation apparatus according to claim 1, wherein
the processor circuit is further configured to estimate, as the execution performance, an execution time taken in a case where the information processing apparatus executes processing of a corresponding segment by an allocated memory control method.

9. The model generation apparatus according to claim 1, wherein
the processor circuit is further configured to estimate, as the execution performance, a lifetime decrease amount obtainable in a case where the information processing apparatus executes processing of a corresponding segment by an allocated memory control method.

10. The model generation apparatus according to claim 1, wherein
the information processing apparatus accesses a main storage memory used in common with a second information processing apparatus, and
the processor circuit is further configured to acquire the time-series data of the operation information that is obtainable in a case where the information processing apparatus and the second information processing apparatus are operated together.

11. The model generation apparatus according to claim 1, wherein
the non-volatile memory includes a plurality of pages;
with respect to each of the plurality of pages, first access processing of writing and reading data transferred from the non-volatile memory to the volatile memory is set or second access processing of directly writing and reading data stored in the non-volatile memory is set, and
each of the plurality of pages is accessed by the first access processing that is set or the second access processing that is set; and
each memory control method represents a ratio between a number of pages set to the first access processing and a number of pages set to the second access processing, among the plurality of pages.

12. A model generation method for generating a decision model for deciding a memory control method based on operation information used by an information processing apparatus that accesses volatile memory and a non-volatile memory as main storage memories, the model generation method performs:
acquiring time-series data of operation information that is obtainable in a case where the information processing apparatus is operated;
dividing the time-series data of the operation information in a time direction to generate a plurality of segments;
allocating any one memory control method of a plurality of memory control methods of the main storage memories to each of the plurality of segments;
estimating, for each of the plurality of segments, execution performance of memory access that is obtainable in a case where the information processing apparatus executes processing of a corresponding segment by an allocated memory control method;
selecting a plurality of training segments in which the estimated execution performance satisfies a predefined condition, from among the plurality of segments; and
generating the decision model based on the selected plurality of training segments and the allocated memory control methods corresponding to the selected plurality of training segments.

13. A computer program product comprising a non-transitory computer readable medium storing a program for causing an information processing apparatus to generate a decision model for deciding a memory control method based on operation information used by an information processing apparatus that accesses a volatile memory and a non-volatile memory as main storage memories, the program causing the information processing apparatus to perform:
acquiring time-series data of operation information that is obtainable in a case where the information processing apparatus is operated;
dividing the time-series data of the operation information in a time direction to generate a plurality of segments;
allocating any one memory control method of a plurality of memory control methods of the main storage memories to each of the plurality of segments;
estimating, for each of the plurality of segments, execution performance of memory access that is obtainable in a case where the information processing apparatus executes processing of a corresponding segment by an allocated memory control method;
selecting a plurality of training segments in which the estimated execution performance satisfies a predefined condition, from among the plurality of segments; and
generating the decision model based on the selected plurality of training segments and the allocated memory control methods corresponding to the selected plurality of training segments.

* * * * *